US007717816B2

(12) United States Patent
Hiraki et al.

(10) Patent No.: US 7,717,816 B2
(45) Date of Patent: May 18, 2010

(54) TRANSMISSION

(75) Inventors: Hikosaburo Hiraki, Tochigi (JP);
Takehiro Komatsu, Hiratsuka (JP)

(73) Assignee: Komatsu Ltd., Tokyo (JP)

( * ) Notice: Subject to any disclaimer, the term of this patent is extended or adjusted under 35 U.S.C. 154(b) by 534 days.

(21) Appl. No.: 11/662,327

(22) PCT Filed: Aug. 31, 2005

(86) PCT No.: PCT/JP2005/015915

§ 371 (c)(1),
(2), (4) Date: Mar. 8, 2007

(87) PCT Pub. No.: WO2006/027983

PCT Pub. Date: Mar. 16, 2006

(65) Prior Publication Data

US 2008/0096712 A1    Apr. 24, 2008

(30) Foreign Application Priority Data

Sep. 8, 2004    (JP)    ............... 2004-260795

(51) Int. Cl.
*F16H 3/72*    (2006.01)
(52) U.S. Cl. ......................................................... 475/5
(58) Field of Classification Search ............... 475/4, 475/75, 5
See application file for complete search history.

(56) References Cited

U.S. PATENT DOCUMENTS

| 3,869,939 | A | 3/1975 | Miyao et al. |
| 3,888,139 | A | 6/1975 | Orshansky, Jr. |
| 3,982,448 | A | 9/1976 | Polak et al. |
| 3,988,949 | A | 11/1976 | Weseloh |
| 4,313,351 | A | 2/1982 | Hagin |
| 4,471,668 | A | 9/1984 | Elsner |
| 4,825,722 | A | 5/1989 | Hagin et al. |
| 4,976,664 | A | 12/1990 | Hagin et al. |

(Continued)

FOREIGN PATENT DOCUMENTS

DE    2141098    2/1973

(Continued)

OTHER PUBLICATIONS

English Translation of DE 2141098, HTTP://WWW.WORLDLING.COM/WL/EPO/EPO.HTML, Dec. 6, 2007.

(Continued)

*Primary Examiner*—Dirk Wright
(74) *Attorney, Agent, or Firm*—Frishauf, Holtz, Goodman & Chick, P.C.

(57)    ABSTRACT

To provide a transmission capable of using pump/motors or generator/motors of smaller maximum torque and of small size. The transmission includes input shaft (4), output shaft (16), a mechanical transmission part interposed between input shaft (4) and output shaft (16) including planetary gear mechanisms (5), (6), and a hydrostatic transmission part interposed between input shaft (4) and output shaft (16) including three pump/motors (21), (25), (31). A rotating shaft of first pump/motor (21) and a rotating shaft of second pump/motor (25) are coupled to the mechanical transmission part. Clutches (34), (35), (36) are provided for coupling a rotating shaft of third pump/motor (31) to at least one of the rotating shaft of first pump/motor (21) and the rotating shaft of second pump/motor (25).

15 Claims, 11 Drawing Sheets

U.S. PATENT DOCUMENTS

| | | | |
|---|---|---|---|
| 5,518,461 A * | 5/1996 | Pfordt | 475/72 |
| 5,709,628 A * | 1/1998 | Pidde et al. | 475/75 |
| 5,890,981 A | 4/1999 | Coutant et al. | |
| 6,383,106 B1 | 5/2002 | Kashiwase | |
| 6,478,705 B1 | 11/2002 | Holmes et al. | |
| 6,520,879 B2 | 2/2003 | Kawabata et al. | |
| 7,070,531 B2 * | 7/2006 | Ishizaki | 475/75 |
| 7,082,760 B2 * | 8/2006 | Legner et al. | 60/484 |
| 7,121,970 B2 | 10/2006 | Funato et al. | |
| 7,195,580 B2 | 3/2007 | Funato et al. | |
| 7,299,891 B2 * | 11/2007 | Legner | 180/307 |
| 2003/0008745 A1 | 1/2003 | Heindl | |
| 2005/0096170 A1 | 5/2005 | Holmes | |
| 2006/0217225 A1 | 9/2006 | Hiraki et al. | |

FOREIGN PATENT DOCUMENTS

| | | |
|---|---|---|
| DE | 33 03 448 A1 | 8/1983 |
| DE | 3438561 A1 | 4/1986 |
| DE | 3733152 A1 | 4/1989 |
| DE | 41 40 979 A1 | 6/1993 |
| DE | 42 00 692 A1 | 7/1993 |
| DE | 197 47 459 A1 | 5/1999 |
| EP | 26115 A2 | 4/1981 |
| EP | 0 234 135 A1 | 9/1987 |
| FR | 2520827 A1 | 8/1983 |
| GB | 2 222 212 A | 2/1990 |
| GB | 2 377 260 A | 1/2003 |
| JP | 50-136571 A | 10/1973 |
| JP | 48-85959 A | 11/1973 |
| JP | 49-3060 | 1/1974 |
| JP | 49-14934 | 4/1974 |
| JP | 49-56068 A | 5/1974 |
| JP | 50-85019 A | 7/1975 |
| JP | 50-136571 A | 10/1975 |
| JP | 51-140068 | 12/1976 |
| JP | 10-159939 A | 6/1998 |
| JP | 11-051149 A | 2/1999 |
| JP | 11-321357 A | 11/1999 |
| JP | 2001-200900 A | 7/2001 |
| JP | 2001-208004 A | 8/2001 |
| JP | 2001-336602 A | 12/2001 |
| JP | 2003-164007 A | 6/2003 |
| JP | 2005-127485 A | 5/2005 |

OTHER PUBLICATIONS

Tomoo Ishihara et al; Design of Hydraulic Power Transmission; Nov. 30, 1967; pp. 191-198.

U.S. Appl. No. 11/920,823, filed Nov. 20, 2007, entitled "Transmission System," Inventor: H. Hiraki et al.

U.S. Appl. No. 11/961,918, filed Dec. 20, 2007, entitled Speed-Changing Device, Inventor: H. Hiraki et al.

English translation of German Office Action Issued for corresponding German Patent Application No. 11 2004 000 874.3-12, dated Jul. 25, 2007, cited in related U.S. Appl. No. 10/556,843 in an IDS filed Sep. 24, 2007, 4 pages.

Extended European Search Report dated Mar. 3, 2010 (in English) issued in counterpart European Application No. 05781320.6-2421/ 1798447.

* cited by examiner

TRANSMISSION

This application is a U.S. National Phase Application under 35 USC 371 of International Application PCT/JP2005/015915 filed Aug. 31, 2005.

TECHNICAL FIELD

The present invention relates to a hydro-mechanical or electro-mechanical transmission including a planetary gear mechanism combined with pump/motors or generator/motors.

BACKGROUND ART

Conventionally known hydraulic transmissions include pure hydraulic transmissions (hydrostatic transmissions referred to as HSTs) which convert all input power from an engine into oil pressure for transmission and hydro-mechanical (power-split type) transmissions (HMTs) which hydraulically transmit part of the input power while mechanically transmitting the rest of the input power. Since the latter transmissions (HMTs), which convert only part of mechanical power into hydraulic power, transmit the mechanical power with high efficiency, they have the advantage of achieving higher efficiency than the former transmissions (HSTs). Accordingly, the HMTs are said to be ideal transmissions for vehicles subjected to significant load changes, such as bulldozers and wheel loaders, and some of them are adopted in such vehicles.

A typical hydro-mechanical transmission (HMT) achieves variable speed characteristics by means of a planetary gear mechanism, or more particularly, by the following arrangement. Of three elements of the planetary gear mechanism (i.e., a sun gear, a carrier provided with planetary gears and a ring gear), a first element is coupled to an input shaft, a second element is coupled to an output shaft, and a third element is coupled to a hydraulic pump or hydraulic motor. Rotational speed of the hydraulic pump or motor is varied, thereby changing rotational speed of the output shaft.

There are two types of HMTs. One is an "output-split type" in which the pump/motor fluidly connected by a hydraulic circuit to another pump/motor coupled to the planetary gear mechanism is coupled to the input shaft of the transmission at a constant speed ratio. The other is an "input-split type" in which the hydraulic pump or hydraulic motor fluidly connected by the hydraulic circuit to another hydraulic pump or hydraulic motor coupled to the planetary gear mechanism is coupled to the output shaft of the transmission at a constant speed ratio.

There is an electro-mechanical transmission (EMT), a technique similar to the HMT. In place of the pump/motor used in the HMT, this EMT uses a generator/motor for converting part of the mechanical power into electric power for transmission. A prior art relating to this EMT is disclosed in patent document 1. The transmission disclosed in this document is an electro-mechanical transmission having two planetary gear mechanisms and two electric motors and is configured to perform shifting with clutches to establish an input-split mode at low speeds and a compound-split (output-split) mode at high speeds.

Here, patent document 1 is U.S. Pat. No. 6,478,705.

DISCLOSURE OF THE INVENTION

Problems to be Solved by the Invention

The pump/motor used in the HMT requires large capacity to produce large torque. In cases where this large-capacity pump/motor is used at high rotations with its capacity reduced, loss due to leakage increases, thus resulting in a reduction in overall efficiency of the transmission. On the other hand, the generator/motor used in the EMT is not good at producing large torque at low speeds, so that the generator/motor which delivers large torque at low speeds is extremely large-sized and expensive. It is therefore desirable that the pump/motor and generator/motor be of small maximum torque and of small size for use.

In the transmission disclosed in patent document 1, the size of the generator/motor (denoted by reference mark 28 in patent document 1) needs to be determined in accordance with one of the input-split and compound-split modes that requires larger maximum torque. In other words, in the transmission disclosed in patent document 1, the generator/motor is not used in a range in the vicinity of the maximum torque in either the input-split mode or the compound-split mode and is thus used without delivering its performance.

If the generator/motor can be constructed so as to be able to produce (or absorb) the maximum torque both in the input-split mode and in the compound-split mode or if a speed reduction ratio of a generator/motor connection part can be optimized both in the input-split mode and in the compound-split mode, the generator/motor can be reduced in size. Similarly, in the HMT which uses the pump/motor in place of the generator/motor, the pump/motor can be reduced in size for increased efficiency.

In view of the conditions discussed above, the present invention aims to provide a hydro-mechanical or electro-mechanical transmission capable of using a pump/motor or generator/motor of smaller maximum torque and of small size.

Means for Solving the Problems

To achieve the above object, a transmission according to a first aspect of the invention includes:
an input shaft;
an output shaft;
a mechanical transmission part interposed between the input shaft and the output shaft including at least one planetary gear mechanism; and
a hydrostatic transmission part interposed between the input shaft and the output shaft including a plurality of pump/motors fluidly interconnected one another through a hydraulic circuit, wherein:
the plurality of pump/motors include a first pump/motor, a second pump/motor and a third pump/motor;
a rotating shaft of the first pump/motor and a rotating shaft of the second pump/motor are coupled to the mechanical transmission part; and
the transmission further includes a coupling mechanism for coupling a rotating shaft of the third pump/motor to at least one of the rotating shaft of the first pump/motor and the rotating shaft of the second pump/motor.

A transmission according to a second aspect of the invention includes:
an input shaft;
an output shaft;
a mechanical transmission part interposed between the input shaft and the output shaft including at least one planetary gear mechanism; and
a hydrostatic transmission part interposed between the input shaft and the output shaft including a plurality of pump/motors fluidly interconnected one another through a hydraulic circuit, wherein:
the mechanical transmission part includes a first planetary gear mechanism and a second planetary gear mechanism;

the plurality of pump/motors include a first pump/motor, a second pump/motor and a third pump/motor;

the input shaft is coupled to a first element of the first planetary gear mechanism;

a rotating shaft of the first pump/motor is coupled to a second element of the first planetary gear mechanism;

a rotating shaft of the second pump/motor is coupled to a first element of the second planetary gear mechanism;

the output shaft is coupled to a third element of the first planetary gear mechanism and a third element of the second planetary gear mechanism; and the transmission further includes:

a first coupling mechanism for coupling a second element of the second planetary gear mechanism to at least one of a fixed end and the second element of the first planetary gear mechanism; and a second coupling mechanism for coupling a rotating shaft of the third pump/motor to at least one of the rotating shaft of the first pump/motor and the rotating shaft of the second pump/motor.

A transmission according to a third aspect of the invention includes:

an input shaft;

an output shaft;

a mechanical transmission part interposed between the input shaft and the output shaft including at least one planetary gear mechanism; and a hydrostatic transmission part interposed between the input shaft and the output shaft including a plurality of pump/motors fluidly interconnected one another through a hydraulic circuit, wherein:

the mechanical transmission part includes a first planetary gear mechanism, a second planetary gear mechanism and a third planetary gear mechanism disposed between the first planetary gear mechanism and the second planetary gear mechanism;

the plurality of pump/motors include a first pump/motor, a second pump/motor and a third pump/motor;

the input shaft is coupled to a first element of the first planetary gear mechanism;

a rotating shaft of the first pump/motor is coupled to a first element of the third planetary gear mechanism;

a rotating shaft of the second pump/motor is coupled to a first element of the second planetary gear mechanism;

the output shaft is coupled to a third element of the first planetary gear mechanism and a third element of the second planetary gear mechanism;

a second element of the first planetary gear mechanism is coupled to a third element of the third planetary gear mechanism;

a second element of the second planetary gear mechanism is coupled to a second element of the third planetary gear mechanism; and the transmission further includes:

a first coupling mechanism for coupling the second element of the second planetary gear mechanism to at least one of a fixed end and the first element of the third planetary gear mechanism; and a second coupling mechanism for coupling a rotating shaft of the third pump/motor to at least one of the rotating shaft of the first pump/motor and the rotating shaft of the second pump/motor.

A transmission according to a fourth aspect of the invention includes:

an input shaft;

an output shaft;

a mechanical transmission part interposed between the input shaft and the output shaft including a planetary gear mechanism; and a hydrostatic transmission part interposed between the input shaft and the output shaft including a plurality of pump/motors fluidly interconnected one another through a hydraulic circuit, wherein:

the plurality of pump/motors include a first pump/motor, a second pump/motor and a third pump/motor;

the input shaft is coupled to a first element of the planetary gear mechanism;

a rotating shaft of the first pump/motor is coupled to a second element of the planetary gear mechanism;

a rotating shaft of the second pump/motor is coupled to a third element of the planetary gear mechanism;

the output shaft is coupled to the second element of the planetary gear mechanism; and the transmission further includes a coupling mechanism for coupling a rotating shaft of the third pump/motor to at least one of the rotating shaft of the first pump/motor and the rotating shaft of the second pump/motor.

A transmission according to a fifth aspect of the invention includes:

an input shaft;

an output shaft;

a mechanical transmission part interposed between the input shaft and the output shaft including a planetary gear mechanism; and a hydrostatic transmission part interposed between the input shaft and the output shaft including a plurality of pump/motors fluidly interconnected one another through a hydraulic circuit, wherein:

the plurality of pump/motors include a first pump/motor, a second pump/motor and a third pump/motor;

the input shaft is coupled to a first element of the planetary gear mechanism;

a rotating shaft of the first pump/motor is coupled to the first element of the planetary gear mechanism;

a rotating shaft of the second pump/motor is coupled to a third element of the planetary gear mechanism;

the output shaft is coupled to a second element of the planetary gear mechanism; and the transmission further includes a coupling mechanism for coupling a rotating shaft of the third pump/motor to at least one of the rotating shaft of the first pump/motor and the rotating shaft of the second pump/motor.

According to a sixth aspect of the invention that is based on the first, fourth or fifth aspect, it is preferable that the transmission further include control means for controlling the coupling mechanism so as to couple the rotating shaft of the third pump/motor to both the rotating shaft of the first pump/motor and the rotating shaft of the second pump/motor for transmission of all power input to the input shaft to the output shaft through the mechanical transmission part alone.

According to a seventh aspect of the invention that is based on the second or third aspect, it is preferable that the transmission further include control means for controlling the second coupling mechanism so as to couple the rotating shaft of the third pump/motor to both the rotating shaft of the first pump/motor and the rotating shaft of the second pump/motor for transmission of all power input to the input shaft to the output shaft through the mechanical transmission part alone.

A transmission according to an eighth aspect of the invention includes:

an input shaft;

an output shaft;

a mechanical transmission part interposed between the input shaft and the output shaft including at least one planetary gear mechanism; and a hydrostatic transmission part interposed between the input shaft and the output shaft including a plurality of pump/motors fluidly interconnected one another through a hydraulic circuit, wherein:

the mechanical transmission part includes a first planetary gear mechanism, a second planetary gear mechanism and a third planetary gear mechanism disposed between the first planetary gear mechanism and the second planetary gear mechanism;

the plurality of pump/motors include a first pump/motor and a second pump/motor;

the input shaft is coupled to a first element of the first planetary gear mechanism;

a rotating shaft of the first pump/motor is coupled to a first element of the third planetary gear mechanism;

a rotating shaft of the second pump/motor is coupled to a first element of the second planetary gear mechanism;

the output shaft is coupled to a third element of the first planetary gear mechanism and a third element of the second planetary gear mechanism;

a second element of the first planetary gear mechanism is coupled to a third element of the third planetary gear mechanism;

a second element of the second planetary gear mechanism is coupled to a second element of the third planetary gear mechanism; and the transmission further includes a coupling mechanism for coupling the second element of the second planetary gear mechanism to at least one of a fixed end and the first element of the third planetary gear mechanism.

According to a ninth aspect of the invention that is based on the first, second, third or eighth aspect, it is preferable that a speed ratio of a low-speed direct point at which a rotational speed of the first pump/motor becomes zero to a high-speed direct point at which a rotational speed of the second pump/motor becomes zero be set at between three and four.

A transmission according to a tenth aspect of the invention includes:

an input shaft;
an output shaft;
a mechanical transmission part interposed between the input shaft and the output shaft including at least one planetary gear mechanism; and
an electric transmission part interposed between the input shaft and the output shaft including a plurality of generator/motors driven and controlled by an inverter, wherein:

the plurality of generator/motors include a first generator/motor, a second generator/motor and a third generator/motor;

a rotating shaft of the first generator/motor and a rotating shaft of the second generator/motor are respectively coupled to the mechanical transmission part; and the transmission further includes a coupling mechanism for coupling a rotating shaft of the third generator/motor to at least one of the rotating shaft of the first generator/motor and the rotating shaft of the second generator/motor.

According to an eleventh aspect of the invention that is based on the tenth aspect, it is preferable that the transmission further include control means for controlling the coupling mechanism so as to couple the rotating shaft of the third generator/motor to both the rotating shaft of first generator/motor and the rotating shaft of the second generator/motor for transmission of all power input to the input shaft to the output shaft through the mechanical transmission part alone.

A transmission according to a twelfth aspect of the invention includes:

an input shaft;
an output shaft;
a mechanical transmission part interposed between the input shaft and the output shaft including at least one planetary gear mechanism; and
an electric transmission part interposed between the input shaft and the output shaft including a plurality of generator/motors driven and controlled by an inverter, wherein:

the mechanical transmission part includes a first planetary gear mechanism and a second planetary gear mechanism;

the plurality of generator/motors include a first generator/motor, a second generator/motor and a third generator/motor;

the input shaft is coupled to a first element of the first planetary gear mechanism;

a rotating shaft of the first generator/motor is coupled to a second element of the first planetary gear mechanism;

a rotating shaft of the second generator/motor is coupled to a first element of the second planetary gear mechanism;

the output shaft is coupled to a third element of the first planetary gear mechanism and a third element of the second planetary gear mechanism; and the transmission further includes:

a first coupling mechanism for coupling a second element of the second planetary gear mechanism to at least one of a fixed end and the second element of the first planetary gear mechanism; and a second coupling mechanism for coupling a rotating shaft of the third generator/motor to at least one of the rotating shaft of the first generator/motor and the rotating shaft of the second generator/motor.

A transmission according to a thirteenth aspect of the invention includes:

an input shaft;
an output shaft;
a mechanical transmission part interposed between the input shaft and the output shaft including at least one planetary gear mechanism; and
an electric transmission part interposed between the input shaft and the output shaft including a plurality of generator/motors driven and controlled by an inverter, wherein:

the mechanical transmission part includes a first planetary gear mechanism, a second planetary gear mechanism and a third planetary gear mechanism disposed between the first and second planetary gear mechanisms;

the plurality of generator/motors include a first generator/motor, a second generator/motor and a third generator/motor;

the input shaft is coupled to a first element of the first planetary gear mechanism;

a rotating shaft of the first generator/motor is coupled to a first element of the third planetary gear mechanism;

a rotating shaft of the second generator/motor is coupled to a first element of the second planetary gear mechanism;

the output shaft is coupled to a third element of the first planetary gear mechanism and a third element of the second planetary gear mechanism;

a second element of the first planetary gear mechanism is coupled to a third element of the third planetary gear mechanism;

a second element of the second planetary gear mechanism is coupled to a second element of the third planetary gear mechanism; and the transmission further includes:

a first coupling mechanism for coupling the second element of the second planetary gear mechanism to at least one of a fixed end and the first element of the third planetary gear mechanism; and a second coupling mechanism for coupling a rotating shaft of the third generator/motor to at least one of the rotating shaft of the first generator/motor and the rotating shaft of the second generator/motor.

According to a fourteenth aspect of the invention that is based on the twelfth or thirteenth aspect, it is preferable that the transmission further include control means for controlling the second coupling mechanism so as to couple the rotating shaft of the third generator/motor to both the rotating shaft of first generator/motor and the rotating shaft of the second generator/motor for transmission of all power input to the input shaft to the output shaft through the mechanical transmission part alone.

A transmission according to a fifteenth aspect of the invention includes:

an input shaft;

an output shaft;

a mechanical transmission part interposed between the input shaft and the output shaft including at least one planetary gear mechanism; and an electric transmission part interposed between the input shaft and the output shaft including a plurality of generator/motors driven and controlled by an inverter, wherein:

the mechanical transmission part includes a first planetary gear mechanism, a second planetary gear mechanism and a third planetary gear mechanism disposed between the first planetary gear mechanism and the second planetary gear mechanism;

the plurality of generator/motors include a first generator/motor and a second generator/motor;

the input shaft is coupled to a first element of the first planetary gear mechanism;

a rotating shaft of the first generator/motor is coupled to a first element of the third planetary gear mechanism;

a rotating shaft of the second generator/motor is coupled to a first element of the second planetary gear mechanism;

the output shaft is coupled to a third element of the first planetary gear mechanism and a third element of the second planetary gear mechanism;

a second element of the first planetary gear mechanism is coupled to a third element of the third planetary gear mechanism;

a second element of the second planetary gear mechanism is coupled to a second element of the third planetary gear mechanism; and the transmission further includes a coupling mechanism for coupling the second element of the second planetary gear mechanism to at least one of a fixed end and the first element of the third planetary gear mechanism.

According to a sixteenth aspect of the invention that is based on the tenth, twelfth, thirteenth or fifteenth aspect, it is preferable that a speed ratio of a low-speed direct point at which a rotational speed of the first generator/motor becomes zero to a high-speed direct point at which a rotational speed of the second generator/motor becomes zero be set at between three and four.

Advantages of the Invention

According to the first through fifth aspects of the invention, the rotating shaft of the third pump/motor is coupled to at least one of the rotating shaft of the first pump/motor and the rotating shaft of the second pump/motor through switching for use, so that the third pump/motor always complements the action of either the first pump/motor or the second pump/motor. Thus, each pump/motor for use can be of smaller maximum torque and smaller size than a conventional pump/motor and can increase efficiency even when used at high rotations with capacity reduced.

According to the third or eighth aspect of the invention, the third planetary gear mechanism is disposed between the first planetary gear mechanism and the second planetary gear mechanism for the purpose of adjusting a speed reduction ratio, so that the speed reduction ratio of the first pump/motor can be optimized both in an input-split mode and in a compound-split mode. Thus, the first pump/motor can be of smaller maximum torque and of small size for use and can increase efficiency even when used at high rotations with its capacity reduced.

According to the sixth or seventh aspect of the invention, coupling the rotating shaft of the third pump/motor to both the rotating shaft of the first pump/motor and the rotating shaft of the second pump/motor can generate a direct point at which all the power input to the input shaft is transmitted to the output shaft through the mechanical transmission part alone.

The tenth, twelfth, thirteenth and fifteenth aspects of the invention refer to the electro-mechanical transmissions that have been changed from the first, second, third and eighth aspects' hydro-mechanical transmissions, respectively. Similarly to the first, second, third and eighth aspects, these aspects' generator/motors can each be of smaller maximum torque and smaller size for use than a conventional generator/motor. The eleventh and fourteenth aspects of the invention refer to the electro-mechanical transmissions that have been changed from the sixth and seventh aspects' hydro-mechanical transmissions, respectively, and similarly to these sixth and seventh aspects, a direct point at which all the power input to the input shaft is transmitted to the output shaft through the mechanical transmission part alone can be generated.

In a construction vehicle such as a bulldozer or a wheel loader, speed at which the vehicle moves is often about three to four times speed at which the vehicle does work. In the bulldozer, for example, the vehicle speed is of the order of 3 km/h during a dozing operation while the maximum speed is of the order of 11 km/h, and in the wheel loader, the vehicle speed is of the order of 10 km/h during a V-shape loading operation while the maximum speed is of the order of 35 km/h. For this reason, applying the transmission of the first, second, third, eighth, tenth, twelfth, thirteenth or fifteenth aspect of the invention to these construction vehicles and setting the low-speed direct point and the high-speed direct point at the speed at which the vehicle does work and the maximum speed, respectively or setting the speed ratio of the low-speed direct point to the high-speed direct point at between three and four as described in the ninth or sixteenth aspect of the invention greatly improve efficiency because these direct points are the points at which transmission efficiency of the transmission is the best.

Figure 1:
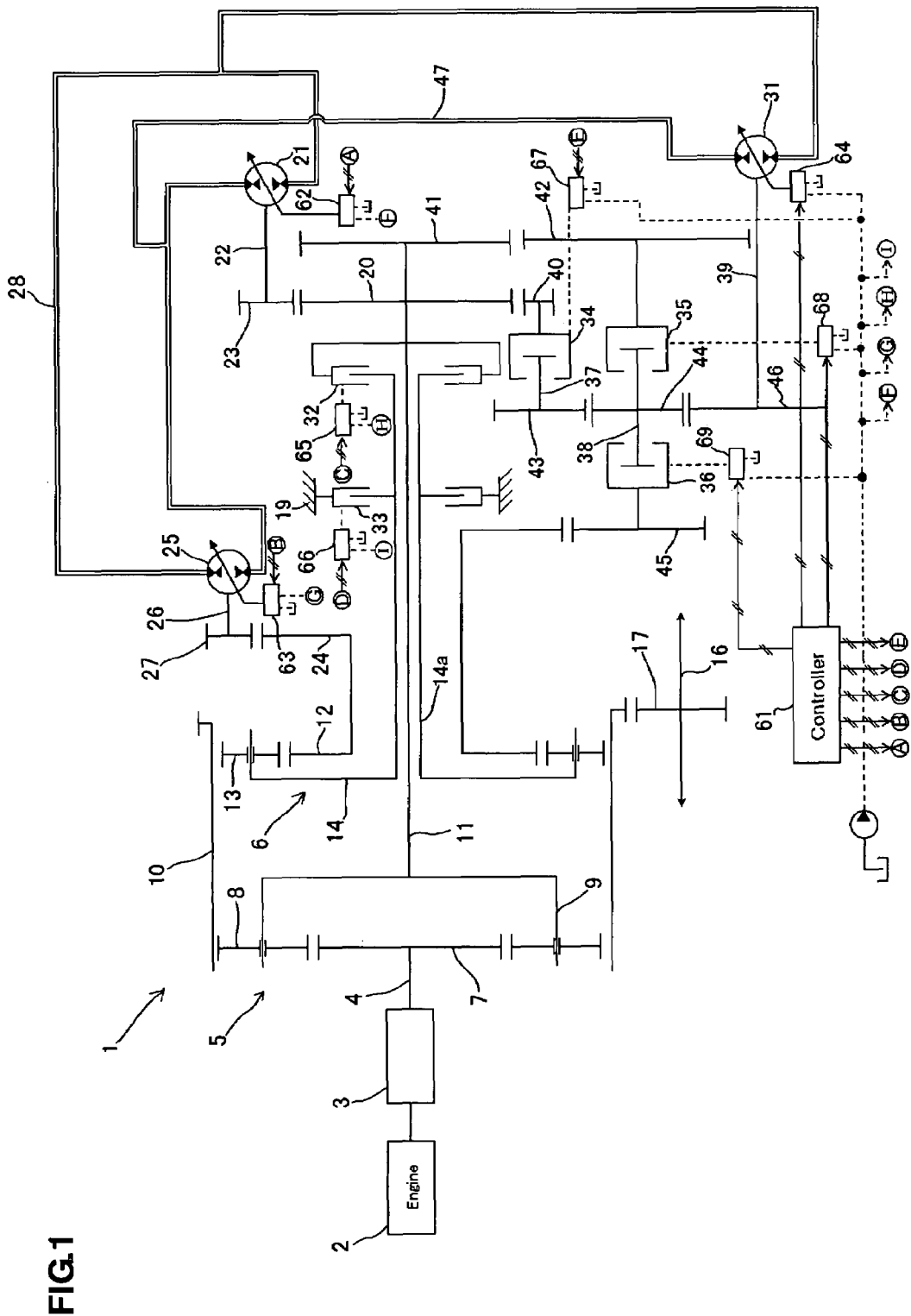
FIG. 1 is a schematic structural diagram of a transmission in accordance with a first exemplary embodiment of the invention.

DESCRIPTION OF REFERENCE MARKS IN THE DRAWINGS 1, 50, 60, 70, 80, 90 transmissions
2 engine
4 input shaft
5, 51 first planetary gear mechanisms
6, 52 second planetary gear mechanisms
7, 12 sun gears
8, 13 planetary gears
9, 14 carriers
10 ring gear
11 intermediate output shaft
16 output shaft
19 fixed end
21 first pump/motor
21A, 25A, 31A generator/motors
25 second pump/motor
31 third pump/motor
32, 34A, 34B first clutches (coupling mechanism)
33, 36B, 36C second clutches (coupling mechanism)
34 third clutch (coupling mechanism)
35, 36A fourth clutches (coupling mechanism)
36 fifth clutch (coupling mechanism)
53 third planetary gear mechanism
61 controller (control means)

DETAILED DESCRIPTION OF THE PREFERRED EMBODIMENTS

Concrete exemplary embodiments of a transmission according to the present invention are demonstrated hereinafter with reference to the accompanying drawings.

First Exemplary Embodiment

FIG. 1 is a schematic structural diagram of a transmission in accordance with the first exemplary embodiment of the invention. The present embodiment is an example of this transmission being applied to an earthmover such as a bulldozer.

Transmission 1 of this embodiment includes input shaft 4 to which power from engine 2 is input through forward/reverse switching mechanism 3, first planetary gear mechanism 5 and second planetary gear mechanisms 6 disposed coaxially with input shaft 4. First planetary gear mechanism 5 includes sun gear 7 fixed to input shaft 4, a plurality of planetary gears 8 meshing with a periphery of sun gear 7, carrier 9 rotatably supporting planetary gears 8 and ring gear 10 meshing with peripheries of planetary gears 8. Carrier 9 is fixed to intermediate output shaft 11. Second planetary gear mechanism 6 includes sun gear 12, a plurality of planetary gears 13 meshing with a periphery of sun gear 12, carrier 14 rotatably supporting planetary gears 13 and ring gear 10 meshing with peripheries of planetary gears 13. Carrier 14 is rotatably supported on intermediate output shaft 11 at its sleeve 14a, and sun gear 12 is rotatably supported on a periphery of sleeve 14a.

First and second planetary gear mechanisms 5, 6 are linked to each other by having their respective ring gears 10, 10 connected. Resulting ring gear 10 meshes with output gear 17 fixed to output shaft 16.

On a terminal side of second planetary gear mechanism 6, first clutch 32 and second clutch 33 are disposed as a coupling mechanism. First clutch 32 has the function of establishing a connection and a disconnection between intermediate output shaft 11 and sleeve 14a of carrier 14, while second clutch 33 has the function of establishing a connection and a disconnection between sleeve 14a and fixed end 19.

First gear 20 is integrally joined to a terminal part of intermediate output shaft 11 and meshes with second gear 23 fixed to output shaft 22 of first pump/motor 21. Third gear 24 is integrally joined to sun gear 12 of second planetary gear mechanism 6 and meshes with fourth gear 27 fixed to output shaft 26 of second pump/motor 25.

First shaft 37, second shaft 38 and third shaft (which is an output shaft of third pump/motor 31) 39 are disposed in parallel with intermediate output shaft 11. First gear 20 joined to the terminal part of intermediate output shaft 11 meshes with fifth gear 40 coupled to first shaft 37 through third clutch 34. Sixth gear 41 provided to the terminal part of intermediate output shaft 11 meshes with seventh gear 42 coupled to second shaft 38 through fourth clutch 35. Eighth gear 43 of first shaft 37 meshes with ninth gear 44 of second shaft 38. Tenth gear 45 coupled to second shaft 38 through fifth clutch 36 meshes with third gear 24 integrally joined to sun gear 12. Ninth gear 44 meshes with eleventh gear 46 fixed to output shaft (third shaft) 39 of third pump/motor 31. It should be noted here that first pump/motor 21 and second pump/motor 25 are fluidly connected to each other through hydraulic piping 28 to which third pump/motor 31 is fluidly connected through hydraulic piping 47.

First, second and third pump/motors 21, 25, 31 are variable displacement type hydraulic pump/motors. First pump/motor 21 is provided with first pump/motor capacity controller 62 which regulates capacity of first pump/motor 21 in response to a command signal from controller (control means) 61. Second pump/motor 25 is provided with second pump/motor capacity controller 63 which regulates capacity of second pump/motor 25 in response to a command signal from controller 61. Third pump/motor 31 is provided with third pump/motor capacity controller 64 which regulates capacity of third pump/motor 31 in response to a command signal from controller 61. First, second, third, fourth and fifth clutches 32, 33, 34, 35, 36 are hydraulically operated clutches. First clutch 32 is provided with first clutch pressure control valve 65 which regulates clutch pressure of first clutch 32 in response to a command signal from controller 61. Second clutch 33 is provided with second clutch pressure control valve 66 which regulates clutch pressure of second clutch 33 in response to a command signal from controller 61. Third clutch 34 is provided with third clutch pressure control valve 67 which regulates clutch pressure of third clutch 34 in response to a command signal from controller 61. Fourth clutch 35 is provided with fourth clutch pressure control valve 68 which regulates clutch pressure of fourth clutch 35 in response to a command signal from controller 61. Fifth clutch 36 is provided with fifth clutch pressure control valve 69 which regulates clutch pressure of fifth clutch 36 in response to a command signal from controller 61. Controller 61 is composed of a central processing unit (CPU) for executing a specified program, a read only memory (ROM) for storing this program and various tables, a writable memory (RAM) serving as a working memory necessary for execution of the program, an input interface and an output interface.

Figure 2:
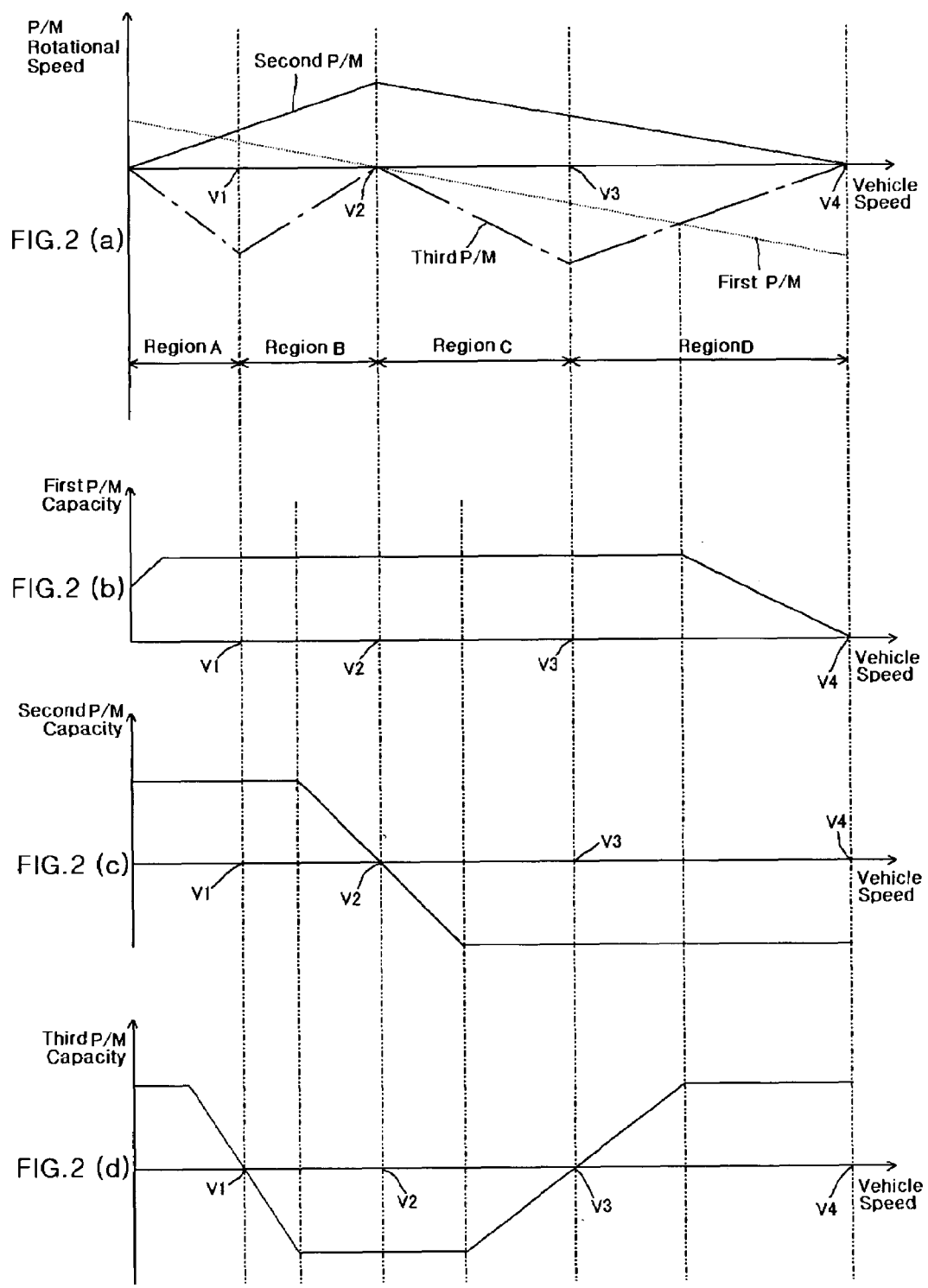
FIG. 2 shows operation characteristics of the transmission in accordance with the first embodiment.

Referring to FIG. 2 showing operation characteristics of this embodiment's transmission 1, a description is now provided of a case where the vehicle is accelerated in a forward direction with engine speed kept constant, starting from an initial state in which first clutch 32 is in its OFF state, second clutch 33 is in its ON state, third clutch 34 is in its OFF state, fourth clutch 35 is in its OFF state, and fifth clutch 36 is in its ON state.

When the vehicle is accelerated starting from the initial state, rotational speed and the capacity of each of pump/motors 21, 25, 31 change as shown in region A of FIG. 2. At this time, the power from engine 2 is input to sun gear 7 of first planetary gear mechanism 5 and then output to ring gear 10 from planetary gears 8. The power input to sun gear 7 is also transmitted to intermediate output shaft 11 from carrier 9 and then output to first pump/motor 21 acting as a pump by way of first gear 20 and second gear 23. The power output to first pump/motor 21 is transmitted to second pump/motor 25 acting as a motor through hydraulic piping 28 and to third pump/motor 31 acting as a motor through hydraulic piping 47. Rotational power of second pump/motor 25 is output from output shaft 26 of second pump/motor 25 to ring gear 10 by way of fourth gear 27, third gear 24, sun gear 12 and planetary gears 13, while rotational power of third pump/motor 31 is output from output shaft 39 of third pump/motor 31 to ring gear 10 by way of eleventh gear 46, ninth gear 44, second shaft 38, tenth gear 45, third gear 24, sun gear 12 and planetary gears 13. In this way, the respective powers from first planetary gear mechanism 5 and second planetary gear mechanism 6 are combined into rotational power of output shaft 16. As described above, the rotating shaft of third pump/motor 31 is coupled to the rotating shaft of second pump/motor 25 in region A to assist the motor action of second pump/motor 25.

At vehicle speed V1 in which the discharge capacity of third pump/motor 31 gradually reduces to zero, fourth clutch 35 is switched to its ON state, and fifth clutch 36 is switched to its OFF state to enter region B of FIG. 2. Accordingly, the power transmitted to intermediate output shaft 11 is output to first pump/motor 21 and is also output to third pump/motor 31 from sixth gear 41 by way of seventh gear 42, second shaft 38, ninth gear 44 and eleventh gear 46. At this time, the rotating shaft of third pump/motor 31 is coupled to the rotating shaft of first pump/motor 21 to perform a pump action, thus assisting first pump/motor 21. At vehicle speed V2, the respective rotational speeds of first and third pump/motors 21, 31 thus become zero, and the capacity of second pump/motor 25 becomes zero. Here, vehicle speed V2 becomes a direct point (i.e., a low-speed direct point) at which all the power from engine 2 is transmitted through a mechanical transmission part alone. In regions A and B of FIG. 2, transmission 1 functions as an input-split type transmission.

Next, to accelerate the vehicle further in the forward direction from vehicle speed V2, first clutch 32 is switched to its ON state, second clutch 33 is switched to its OFF state, third clutch 34 is switched to its ON state, and fourth clutch 35 is switched to its OFF state with fifth clutch 36 kept in its OFF state (region C of FIG. 2). Accordingly, the power from engine 2 is input to sun gear 7 of first planetary gear mechanism 5 and then output to ring gear 10 from planetary gears 8. The power input to sun gear 7 is also transmitted to intermediate output shaft 11 from carrier 9 and then output to second pump/motor 25 acting as a pump by way of carrier 14, sun gear 12, third gear 24 and fourth gear 27. The power output to second pump/motor 25 is transmitted to first pump/motor 21 acting as a motor through hydraulic piping 28 and to third pump/motor 31 acting as a motor through hydraulic piping 47. Rotational power of first pump/motor 21 is output from output shaft 22 of first pump/motor 21 to ring gear 10 by way of second gear 23, first gear 20, carrier 14 and planetary gears 13, while the rotational power of third pump/motor 31 is output from output shaft 39 of third pump/motor 31 to ring gear 10 by way of eleventh gear 46, ninth gear 44, eighth gear 43, first shaft 37, fifth gear 40, first gear 20, carrier 14 and planetary gears 13. In this way, the respective powers from first planetary gear mechanism 5 and second planetary gear mechanism 6 are combined into the rotational power of output shaft 16. As described above, the rotating shaft of third pump/motor 31 is continuously coupled to the rotating shaft of first pump/motor 21 in region C to assist the motor action of first pump/motor 21. It is to be noted that the shift from region B to region C involves reversal of the direction of rotation of first pump/motor 21.

At vehicle speed V3 in which the discharge capacity of third pump/motor 31 gradually reduces to zero, third clutch 34 is switched to its OFF state, and fifth clutch 36 is switched to its ON state to enter region D of FIG. 2. Accordingly, the power transmitted to intermediate output shaft 11 is output to second pump/motor 25 and is also output to third pump/motor 31 from carrier 14 by way of tenth gear 45, second shaft 38, ninth gear 44 and eleventh gear 46. At this time, the rotating shaft of third pump/motor 31 is coupled to the rotating shaft of second pump/motor 25 to perform a pump action, thus assisting second pump/motor 25. At vehicle speed V4, the respective rotational speeds of second and third pump/motors 25, 31 thus become zero, and the capacity of first pump/motor 21 becomes zero. Here, vehicle speed V4 becomes a direct point (i.e., a high-speed direct point) at which all the power from engine 2 is transmitted through the mechanical transmission part alone. In regions C and D of FIG. 2, transmission 1 functions as a compoundsplit type transmission.

As described above, in transmission 1 of the present embodiment, switching is performed so that the rotating shaft of third pump/motor 31 is coupled to the rotating shaft of second pump/motor 25 to perform the motor action in region A of FIG. 2, is coupled to the rotating shaft of first pump/motor 21 to perform the pump action in region B, is coupled to the rotating shaft of first pump/motor 21 to perform the motor action in region C and is coupled to the rotating shaft of second pump/motor 25 to perform the pump action in region D. With the rotating shaft of third pump/motor 31 coupled to the rotating shaft of first pump/motor 21 or the rotating shaft of second pump/motor 25 through switching for use, third pump/motor 31 always complements the action of either pump/motor 21 or pump/motor 25. Thus, each of pump/motors 21, 25, 31 for use can be of smaller maximum torque and smaller size than a conventional pump/motor and can increase efficiency even when used at high rotations with its capacity reduced.

In transmission 1 of this embodiment, a compound planetary gear mechanism formed of first planetary gear mechanism 5 and second planetary gear mechanism 6 is adopted, and switching between the input-split type and the compound-split type is done by the clutches for shifting, so that transmission 1 can have the direct point (at which the hydraulically transmitted power becomes zero) both at the low speed and at the high speed. In a construction vehicle such as the bulldozer or a wheel loader, the speed at which the vehicle moves is often about three to four times the speed at which the vehicle does work. In the bulldozer, for example, the vehicle speed is of the order of 3 km/h during a dozing operation while the maximum speed is of the order of 11 km/h. In the wheel loader, the vehicle speed is of the order of 10 km/h during a V-shape loading operation while the maximum speed is of the order of 35 km/h. For this reason, applying the present embodiment's transmission 1 to these construction vehicles and setting the low-speed direct point and the high-speed direct point at the speed at which the vehicle does work and the maximum speed, respectively greatly improve efficiency because these direct points are the points at which transmission efficiency of the transmission is the best.

According to the present embodiment, when switching takes place between the input-split type and the compound-split type, the capacity of second pump/motor 25 becomes zero, and no torque is imposed on second pump/motor 25. This facilitates the switching.

When the coupling of the rotating shaft of third pump/motor 31 is switched at vehicle speeds V1, V3, bringing fourth clutch 35 and fifth clutch 36 to their ON states at the same time at vehicle speed V1 and bringing third clutch 34 and fifth clutch 36 to their ON states at the same time at vehicle speed V3 allow vehicle speeds V1, V3 to become direct points at which all the power is transmitted through the mechanical transmission part alone. That brings the total number of direct points to four including the aforementioned low-speed direct point (mode switching point) and the aforementioned high-speed direct point.

In this embodiment, clutches 32, 33, 34, 35, 36 that are adopted can each be, for example, a synchromesh mechanism or a multiple disc clutch mechanism other than a dog clutch.

Second Exemplary Embodiment

Figure 3:
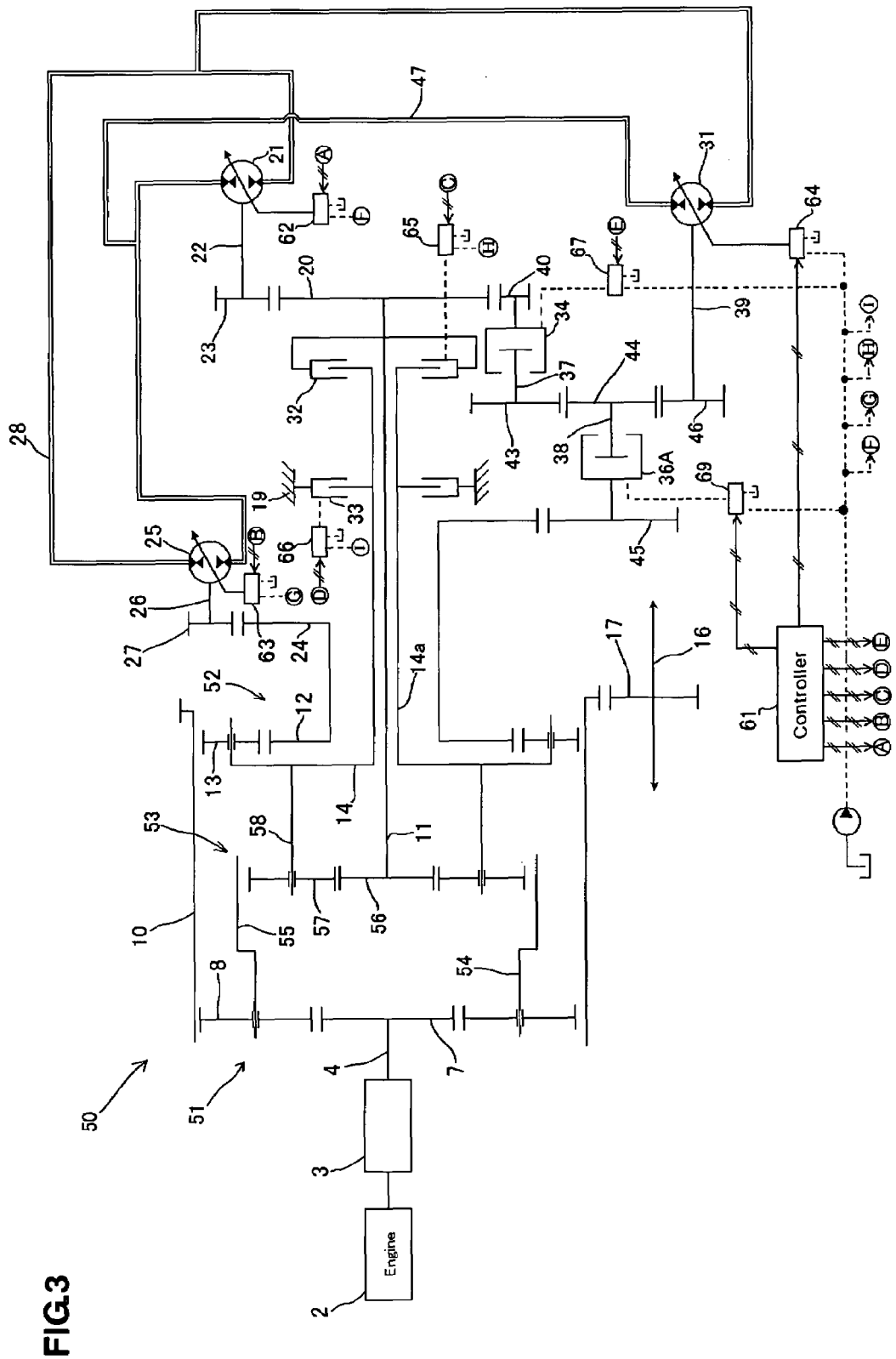
FIG. 3 is a schematic structural diagram of a transmission in accordance with a second exemplary embodiment of the invention.
Figure 4:
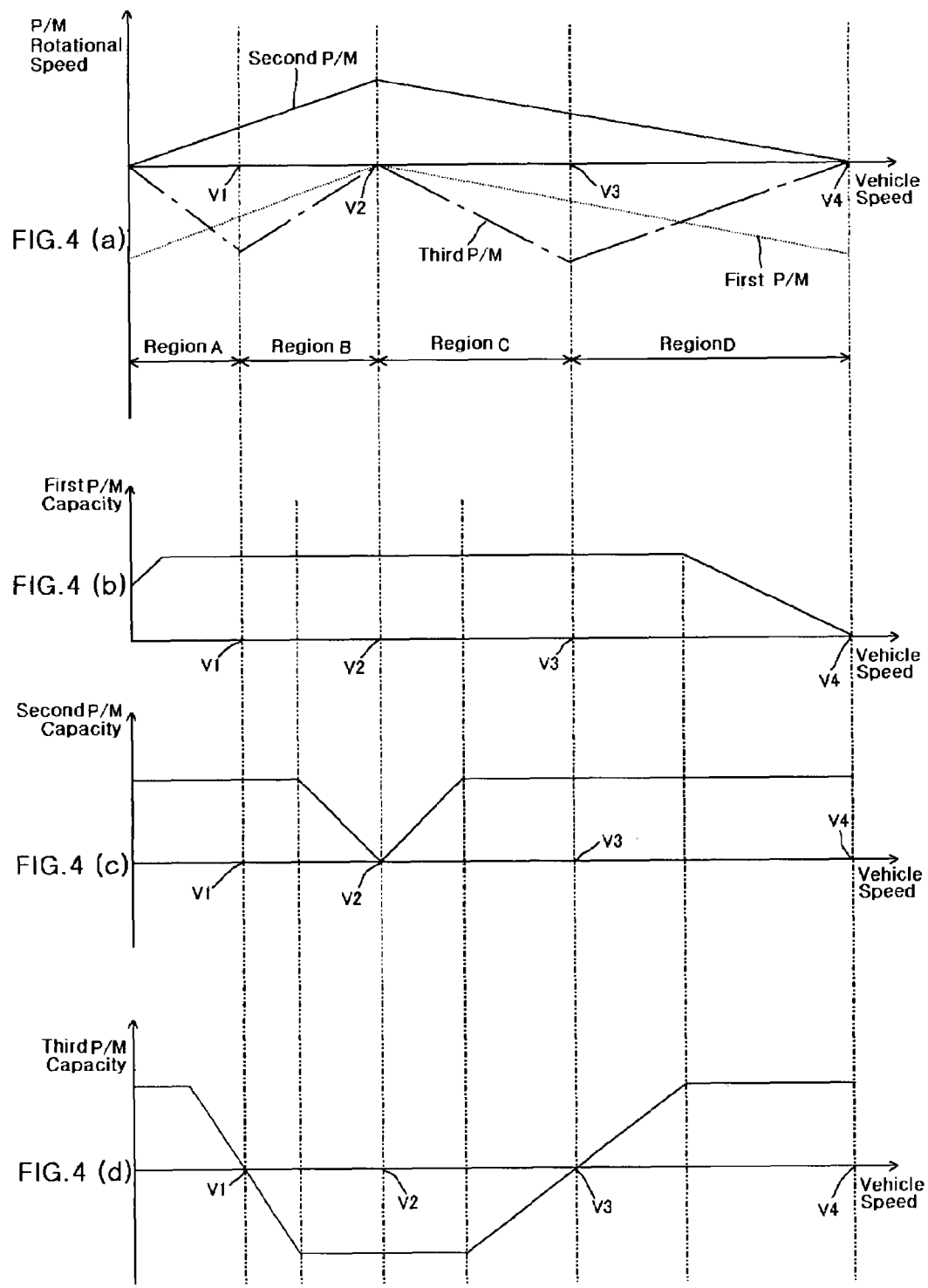
FIG. 4 shows operation characteristics of the transmission in accordance with the second embodiment.

FIG. 3 is a schematic structural diagram of a transmission in accordance with the second exemplary embodiment of the invention, and FIG. 4 shows operation characteristics of the transmission of the present embodiment. In this embodiment, elements similar to those in the first embodiment have the same reference marks in the drawing, and the detailed descriptions of those elements are omitted.

In transmission 50 of this embodiment, third planetary gear mechanism 53 for adjusting a speed reduction ratio is disposed between first planetary gear mechanism 51 and second planetary gear mechanism 52.

First planetary gear mechanism 51 includes sun gear 7 fixed to input shaft 4, a plurality of planetary gears 8 meshing with a periphery of sun gear 7 and carrier 54 rotatably supporting planetary gears 8. Carrier 54 is fixed to ring gear 55 of third planetary gear mechanism 53. Third planetary gear mechanism 53 includes sun gear 56, a plurality of planetary gears 57 meshing with a periphery of sun gear 56, carrier 58 rotatably supporting planetary gears 57 and ring gear 55 meshing with peripheries of planetary gears 57. Carrier 58 is fixed to carrier 14 of second planetary gear mechanism 52, and sun gear 56 is fixed to intermediate output shaft 11.

First clutch 32 is provided for establishing a connection and a disconnection between intermediate output shaft 11 and sleeve 14a of carrier 14, and second clutch 33 is provided for establishing a connection and a disconnection between sleeve 14a and fixed end 19. In parallel with intermediate output shaft 11, first shaft 37, second shaft 38 and third shaft (which is an output shaft of third pump/motor 31) 39 are disposed. First gear 20 joined to a terminal part of intermediate output shaft 11 meshes with fifth gear 40 coupled to first shaft 37 through third clutch 34. Eighth gear 43 of first shaft 37 meshes with ninth gear 44 of second shaft 38. Tenth gear 45 coupled to second shaft 38 through fourth clutch 36A meshes with third gear 24 integrally joined to sun gear 12 of second planetary gear mechanism 52. Ninth gear 44 meshes with eleventh gear 46 fixed to output shaft (third shaft) 39 of third pump/motor 31.

In transmission 50 of the present embodiment, when a vehicle is accelerated in a forward direction with engine speed kept constant and with first clutch 32 and third clutch 34 being in their OFF states and with second clutch 33 and fourth clutch 36A being in their ON states (region A of FIG. 4), power from engine 2 is input to sun gear 7 of first planetary gear mechanism 51 and then output to ring gear 10 from planetary gears 8. The power input to sun gear 7 is also transmitted from carrier 54 to intermediate output shaft 11 while being increased in speed by way of ring gear 55, planetary gears 57 and sun gear 56 of third planetary gear mechanism 53 and then output to first pump/motor 21 acting as a pump by way of first gear 20 and second gear 23. The power output to this first pump/motor 21 is transmitted to second pump/motor 25 acting as a motor through hydraulic piping 28 and to third pump/motor 31 acting as a motor through hydraulic piping 47. Rotational power of second pump/motor 25 is output from output shaft 26 of second pump/motor 25 to ring gear 10 by way of fourth gear 27, third gear 24, sun gear 12 and planetary gears 13, while rotational power of third pump/motor 31 is output from output shaft 39 of third pump/motor 31 to ring gear 10 by way of eleventh gear 46, ninth gear 44, second shaft 38, tenth gear 45, third gear 24, sun gear 12 and planetary gears 13. In this way, the respective powers from first planetary gear mechanism 51 and second planetary gear mechanism 52 are combined into rotational power of output shaft 16. As described above, the rotating shaft of third pump/motor 31 is coupled to the rotating shaft of second pump/motor 25 in region A to assist the motor action of second pump/motor 25.

At vehicle speed V1 in which discharge capacity of third pump/motor 31 gradually reduces to zero, third clutch 34 is switched to its ON state, and fourth clutch 36A is switched to its OFF state to enter region B of FIG. 4. Accordingly, the power transmitted to intermediate output shaft 11 is output to first pump/motor 21 and also to third pump/motor 31 from fifth gear 40 by way of first shaft 37, eighth gear 43, ninth gear 44 and eleventh gear 46. At this time, the rotating shaft of third pump/motor 31 is coupled to a rotating shaft of first pump/motor 21 to perform a pump action, thus assisting first pump/motor 21. At vehicle speed V2, respective rotational speeds of first and third pump/motors 21, 31 thus become zero, and capacity of second pump/motor 25 becomes zero. Here, vehicle speed V2 becomes a direct point (i.e., a low-speed direct point) at which all the power from engine 2 is transmitted through a mechanical transmission part alone. In regions A and B of FIG. 4, transmission 50 functions as an input-split type transmission.

Next, to accelerate the vehicle further in the forward direction from vehicle speed V2, first clutch 32 is switched to its ON state, and second clutch 33 is switched to its OFF state (region C of FIG. 4). Accordingly, the power from engine 2 is input to sun gear 7 of first planetary gear mechanism 51 and then output to ring gear 10 from planetary gears 8. The power input to sun gear 7 is also transmitted from carrier 54 to intermediate output shaft 11 while being increased in speed by way of ring gear 55, planetary gears 57 and sun gear 56 of third planetary gear mechanism 53 and then output to second pump/motor 25 acting as a pump by way of carrier 14, sun gear 12, third gear 24 and fourth gear 27. The power output to this second pump/motor 25 is transmitted to first pump/motor 21 acting as a motor through hydraulic piping 28 and to third pump/motor 31 acting as a motor through hydraulic piping 47. Rotational power of first pump/motor 21 is output from output shaft 22 of first pump/motor 21 to ring gear 10 by way of second gear 23, first gear 20, carrier 14 and planetary gears 13, while the rotational power of third pump/motor 31 is output from output shaft 39 of third pump/motor 31 to ring gear 10 by way of eleventh gear 46, ninth gear 44, eighth gear 43, first shaft 37, fifth gear 40, first gear 20, carrier 14 and planetary gears 13. In this way, the respective powers from first planetary gear mechanism 51 and second planetary gear mechanism 52 are combined into the rotational power of output shaft 16. As described above, the rotating shaft of third pump/motor 31 is continuously coupled to the rotating shaft of first pump/motor 21 in region C to assist the motor action of first pump/motor 21. It is to be noted that the shift from region B to region C does not change the direction of rotation of first pump/motor 21.

At vehicle V3 in which the discharge capacity of third pump/motor 31 gradually reduces to zero, third clutch 34 is switched to its OFF state, and fourth clutch 36A is switched to its ON state to enter region D of FIG. 4. Accordingly, the power transmitted to intermediate output shaft 11 is output to second pump/motor 25 and also to third pump/motor 31 from carrier 14 by way of tenth gear 45, second shaft 38, ninth gear 44 and eleventh gear 46. At this time, the rotating shaft of third pump/motor 31 is coupled to the rotating shaft of second pump/motor 25 to perform a pump action, thus assisting second pump/motor 25. At vehicle speed V4, rotational speed of second pump/motor 25 and the rotational speed of third pump/motor 31 thus become zero, and capacity of first pump/motor 21 becomes zero. Here, vehicle speed V4 becomes a direct point (i.e., a high-speed direct point) at which all the power from engine 2 is transmitted through the mechanical transmission part alone. In regions C and D of FIG. 4, transmission 1 functions as a compound-split type transmission.

Similarly to the first embodiment, with the rotating shaft of third pump/motor 31 coupled to the rotating shaft of first pump/motor 21 or the rotating shaft of second pump/motor 25 through switching for use in this embodiment's transmission 50, each of pump/motors 21, 25, 31 for use can be of smaller maximum torque and smaller size than a conventional pump/motor and can increase efficiency even when used at high rotations with its capacity reduced.

In transmission 50 of this embodiment, third planetary gear mechanism 53 is disposed between first planetary gear mechanism 51 and second planetary gear mechanism 52 for the purpose of adjusting the speed reduction ratio, so that the speed reduction ratio of the first pump/motor can be optimized both in the input-split mode and in the compound-split mode. Thus, the first pump/motor can be of smaller maximum torque and of small size for use and can increase efficiency even when used at high rotations with its capacity reduced.

In the present embodiment, a one-way rotating type pump/motor can be used as first pump/motor 21, whereby the structure of the transmission can be simplified.

When the coupling of the rotating shaft of third pump/motor 31 is switched at vehicle speeds V1, V3, bringing third clutch 34 and fourth clutch 36A to their respective ON states at the same time allows vehicle speeds V1, V3 to become direct points at which all the power is transmitted through the mechanical transmission part alone. That brings the total number of direct points to four including the aforementioned low-speed direct point (mode switching point) and the aforementioned high-speed direct point.

Third Exemplary Embodiment

In the first embodiment, the two planetary gear mechanisms have been used, and one of the three pump/motors has been used through switching. In the second embodiment, the three planetary gear mechanisms have been used, and one of the three pump/motors has been used through switching. The use of three pump/motors and the use of one of these pump/motors through switching can be applied to a conventional HMT having a single planetary mechanism.

Figure 5:
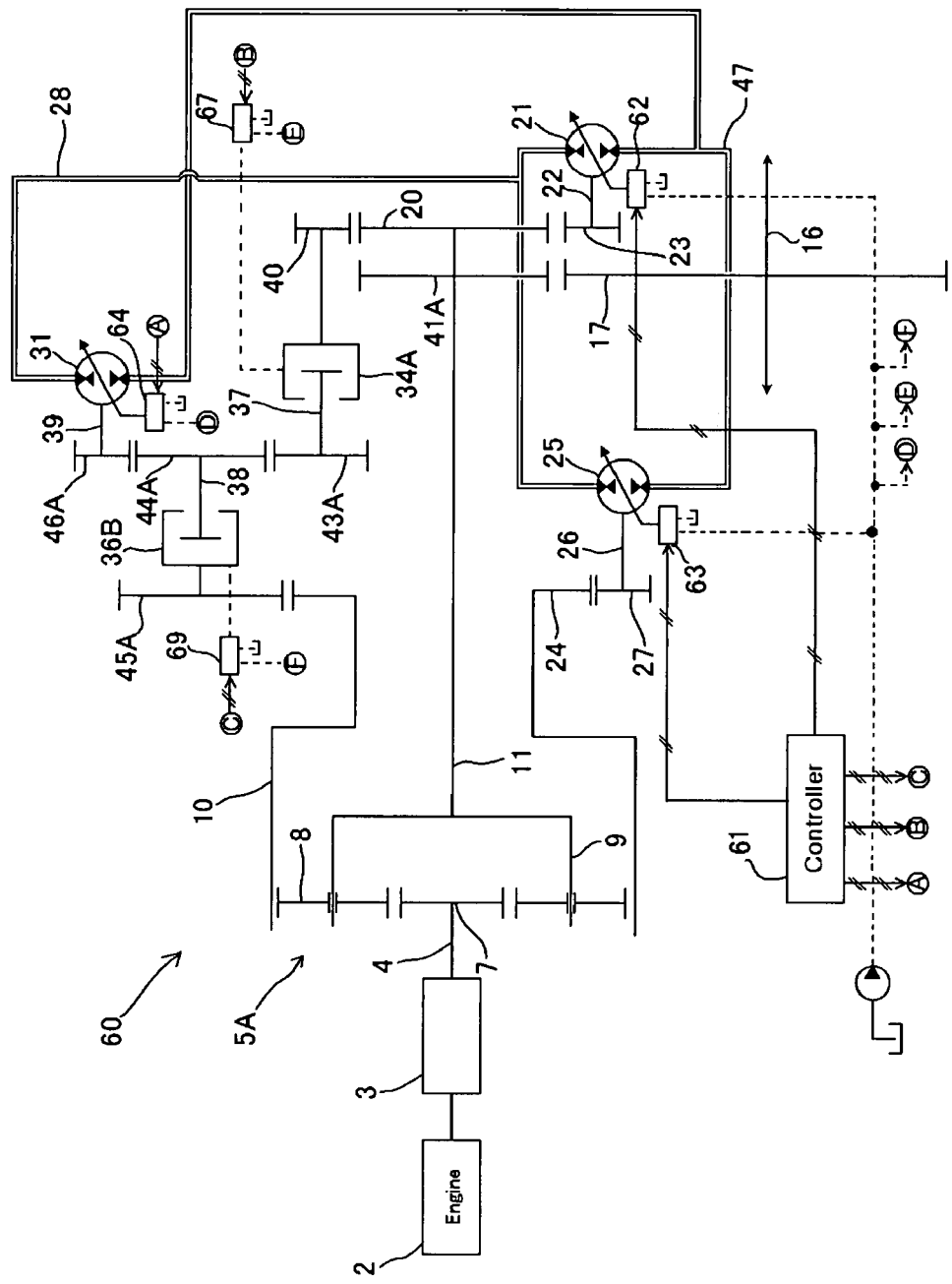
FIG. 5 is a schematic structural diagram of a transmission in accordance with a third exemplary embodiment of the invention.
Figure 6:
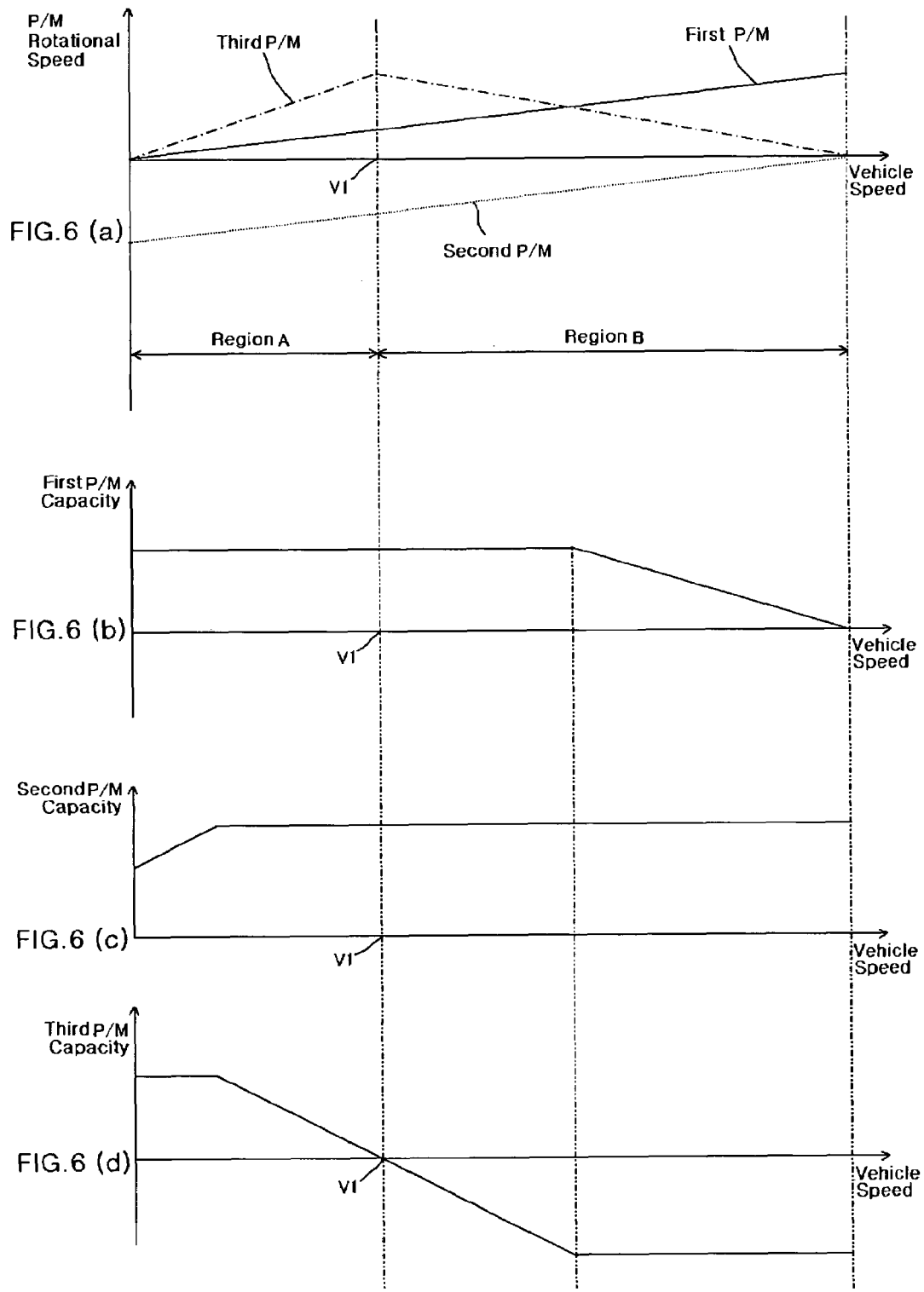
FIG. 6 shows operation characteristics of the transmission in accordance with the third embodiment.

FIG. 5 is a schematic structural diagram of a transmission in accordance with the third exemplary embodiment of the invention according to which three pump/motors are applied to the input-split type transmission having the single planetary gear mechanism. FIG. 6 shows operation characteristics of the transmission of the present embodiment. In this embodiment, elements similar to those in the foregoing embodiments have the same reference marks in the drawing, and the detailed descriptions of those elements are omitted.

In transmission 60 of this embodiment, sun gear 7 of planetary gear mechanism 5A is fixed to input shaft 4 to which power from engine 2 is input. A plurality of planetary gears 8 mesh with a periphery of sun gear 7 and are rotatably supported by carrier 9 which is fixed to intermediate output shaft 11. Ring gear 10 meshes with peripheries of planetary gears 8. First gear 20 is integrally joined to a terminal part of intermediate output shaft 11 and meshes with second gear 23 fixed to output shaft 22 of first pump/motor 21. Third gear 24 is integrally joined to a periphery of ring gear 10 and meshes with fourth gear 27 fixed to output shaft 26 of second pump/motor 25.

First shaft 37, second shaft 38 and third shaft 39 are disposed in parallel with intermediate output shaft 11. First gear 20 of intermediate output shaft 11 meshes with fifth gear 40 coupled to first shaft 37 through first clutch 34A. Sixth gear 43A of first shaft 37 meshes with seventh gear 44A of second shaft 38. Eighth gear 45A coupled to second shaft 38 through second clutch 36B meshes with third gear 24. Seventh gear 44A meshes with ninth gear 46A fixed to output shaft (third shaft) 39 of third pump/motor 31. Tenth gear 41A fixed to intermediate output shaft 11 meshes with output gear 17 fixed to output shaft 16.

This embodiment's transmission 60 operates as follows. When a vehicle is accelerated in a forward direction with engine speed kept constant and with first clutch 34A and second clutch 36B being in their respective ON and OFF states (region A of FIG. 6), the power from engine 2 is input to sun gear 7 of planetary gear mechanism 5A, transmitted to intermediate output shaft 11 by way of planetary gears 8 and carrier 9 and then transmitted to output shaft 16 by way of tenth gear 41A and output gear 17. The power transmitted to intermediate output shaft 11 is also output to first pump/motor 21 acting as a pump by way of first gear 20 and second gear 23 and to third pump/motor 31 acting as a pump from first gear 20 by way of fifth gear 40, first shaft 37, sixth gear 43A, seventh gear 44A and ninth gear 46A. The powers output to these first and third pump/motors 21, 31 are transmitted to second pump/motor 25 acting as a motor through respective hydraulic pipings 47, 28 and then output from output shaft 26 of second pump/motor 25 to intermediate output shaft 11 by way of fourth gear 27, third gear 24, ring gear 10, planetary gears 8 and carrier 9. In this way, the mechanical power from planetary gear mechanism 5A and the hydraulic power from second pump/motor 25 are combined into rotational power of output shaft 16.

At vehicle speed V1 in which discharge capacity of third pump/motor 31 gradually reduces to zero, first clutch 34A is switched to its OFF state, and second clutch 36B is switched to its ON state to enter region B of FIG. 6. Accordingly, third pump/motor 31 is switched from the pump to a motor. More specifically, the power from engine 2 is input to sun gear 7 of planetary gear mechanism 5A, transmitted to intermediate output shaft 11 by way of planetary gears 8 and carrier 9 and then transmitted to output shaft 16 by way of tenth gear 41A and output gear 17. The power transmitted to intermediate output shaft 11 is output to first pump/motor 21 acting as a pump by way of first gear 20 and second gear 23. The power output to this first pump/motor 21 is transmitted to second pump/motor 25 and third pump/motor 31 both acting as motors through hydraulic pipings 47, 28, respectively. Power of second pump/motor 25 is output from output shaft 26 of second pump/motor 25 to intermediate output shaft 11 by way of fourth gear 27, third gear 24, ring gear 10, planetary gears 8 and carrier 9, while power of third pump/motor 31 is output from output shaft 39 of third pump/motor 31 to intermediate output shaft 11 by way of ninth gear 46A, seventh gear 44A, second shaft 38, eighth gear 45A, third gear 24, ring gear 10, planetary gears 8 and carrier 9. In this way, the mechanical power from planetary gear mechanism 5A and the hydraulic powers from second and third pump/motors 25, 31 are combined into the rotational power of output shaft 16.

As described above, with the rotating shaft of third pump/motor 31 coupled to the rotating shaft of first pump/motor 21 or the rotating shaft of second pump/motor 25 through switching for use in this embodiment, each pump/motor for use can be of smaller maximum torque and smaller size than a conventional pump/motor and can increase efficiency even when used at high rotations with its capacity reduced.

Fourth Exemplary Embodiment

Figure 7:
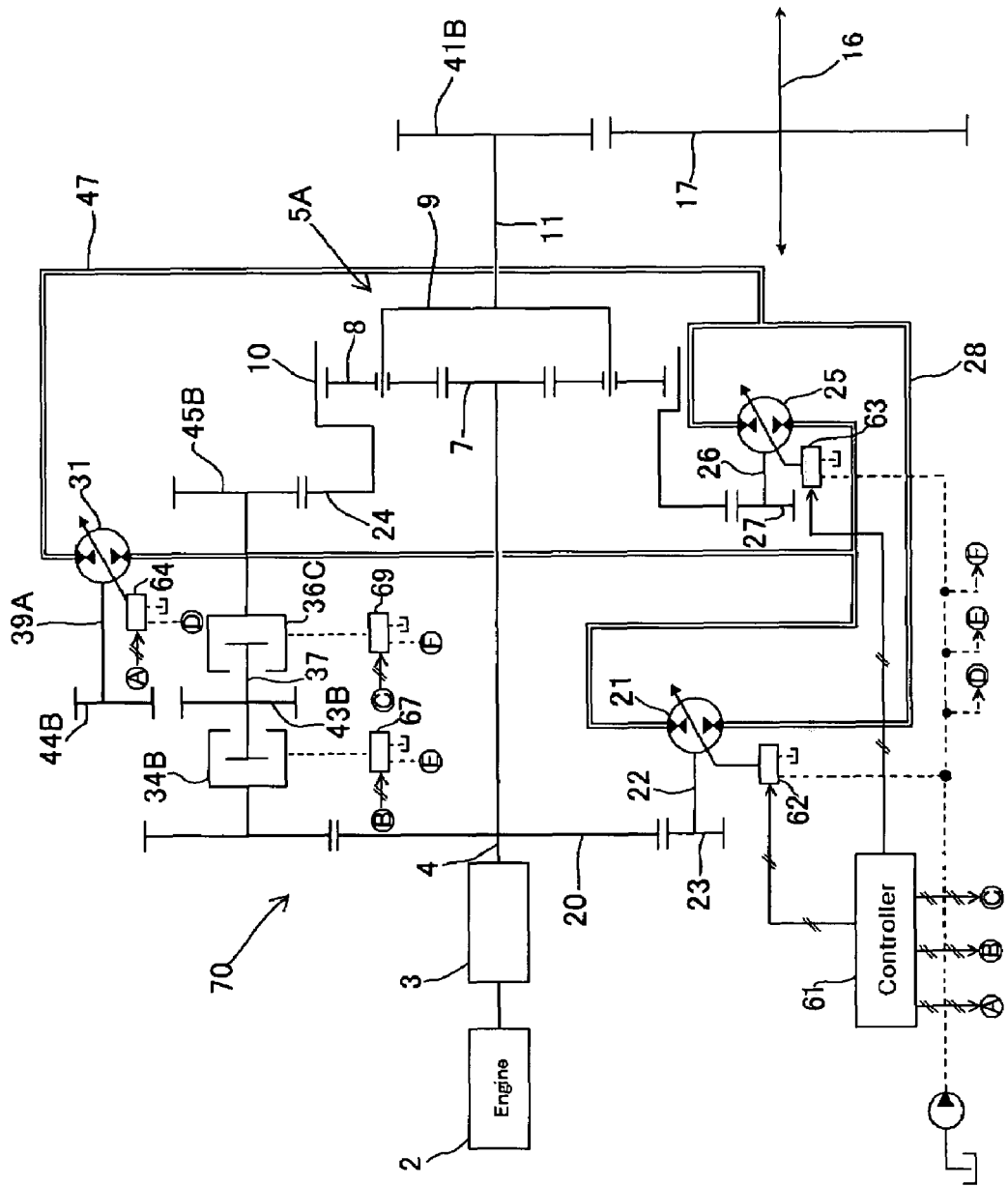
FIG. 7 is a schematic structural diagram of a transmission in accordance with a fourth exemplary embodiment of the invention.
Figure 8:
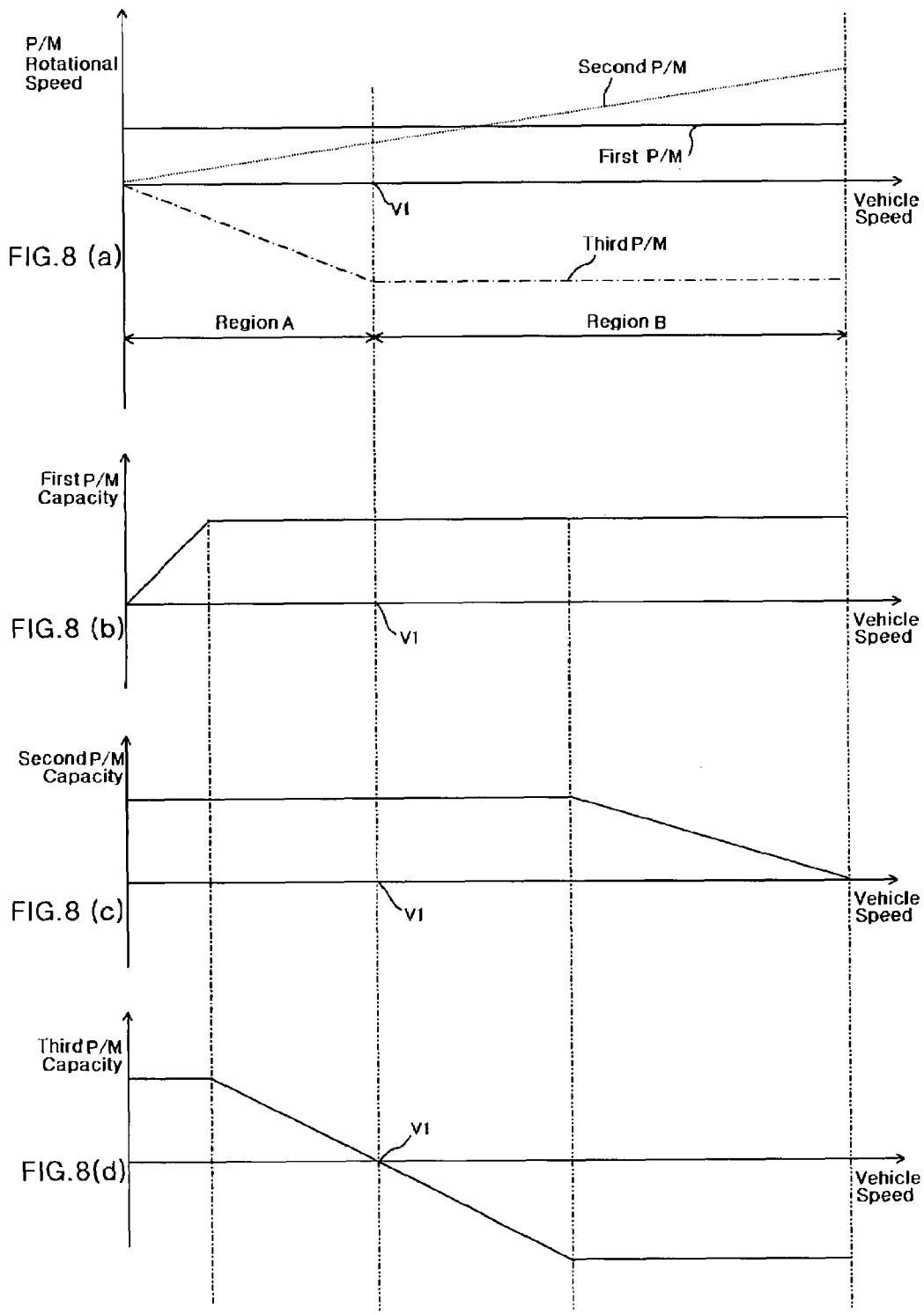
FIG. 8 shows operation characteristics of the transmission in accordance with the fourth embodiment.

FIG. 7 is a schematic structural diagram of a transmission in accordance with the fourth exemplary embodiment of the invention according to which three pump/motors are applied to the output-split type transmission having a single planetary gear mechanism. FIG. 8 shows operation characteristics of the transmission of the present embodiment. In this embodiment, elements similar to those in the foregoing embodiments have the same reference marks in the drawing, and the detailed descriptions of those elements are omitted.

In transmission 70 of this embodiment, first gear 20 is fixed to input shaft 4 to which power from engine 2 is input. Second gear 23 meshing with first gear 20 is fixed to output shaft 22 of first pump/motor 21. Sun gear 7 of planetary gear mechanism 5A is fixed to input shaft 4. A plurality of planetary gears 8 mesh with a periphery of sun gear 7 and are rotatably supported by carrier 9 which is fixed to intermediate output shaft 11. Ring gear 10 meshes with peripheries of planetary gears 8. Third gear 24 is integrally joined to a periphery of ring gear 10 and meshes with fourth gear 27 fixed to output shaft 26 of second pump/motor 25.

First shaft 37 and second shaft (which is an output shaft of third pump/motor 31) 39A are disposed in parallel with input shaft 4. First gear 20 of input shaft 4 meshes with fifth gear 40A coupled to first shaft 37 through first clutch 34B. Sixth gear 43B of first shaft 37 meshes with seventh gear 44B of second shaft 39A. Eighth gear 45B coupled to first shaft 37 through second clutch 36C meshes with third gear 24. Ninth gear 41B fixed to a terminal part of intermediate output shaft 11 meshes with output gear 17 fixed to output shaft 16.

This embodiment's transmission 70 operates as follows. When a vehicle is accelerated in a forward direction with engine speed kept constant and with first clutch 34B and second clutch 36C being in their respective OFF and ON states (region A of FIG. 8), the power from engine 2 is input from input shaft 4 to sun gear 7 of planetary gear mechanism 5A, transmitted to intermediate output shaft 11 by way of planetary gears 8 and carrier 9 and then transmitted to output shaft 16 by way of ninth gear 41B and output gear 17. The power from input shaft 4 is output to first pump/motor 21 acting as a pump by way of first gear 20 and second gear 23. The power output to this first pump/motor 21 is transmitted to second pump/motor 25 acting as a motor through hydraulic piping 28 and to third pump/motor 31 acting as a motor through hydraulic piping 47. Rotational power of second pump/motor 25 is output from output shaft 26 of second pump/motor 25 to intermediate output shaft 11 by way of fourth gear 27, third gear 24, planetary gears 8 and carrier 9, while rotational power of third pump/motor 31 is output from output shaft 39A of third pump/motor 31 to intermediate output shaft 11 by way of seventh gear 44B, sixth gear 43B, first shaft 37, eighth gear 45B, third gear 24, planetary gears 8 and carrier 9. In this way, the mechanical power from planetary gear mechanism 5A and the hydraulic powers from second and third pump/motors 25, 31 are combined into rotational power of output shaft 16.

At vehicle speed V1 in which discharge capacity of third pump/motor 31 gradually reduces to zero, first clutch 34B is switched to its ON state, and second clutch 36C is switched to its OFF state to enter region B of FIG. 8. Accordingly, third pump/motor 31 is switched from the motor to a pump. More specifically, the power from engine 2 is input from input shaft 4 to sun gear 7 of planetary gear mechanism 5A, transmitted to intermediate output shaft 11 by way of planetary gears 8 and carrier 9 and then transmitted to output shaft 16 by way of ninth gear 41B and output gear 17. The power from input shaft 4 is output to first pump/motor 21 acting as a pump by way of first gear 20 and second gear 23 and to third pump/motor 31 by way of first gear 20, fifth gear 40A, first shaft 37, sixth gear 43B and seventh gear 44B. The powers output to these first and third pump/motors 21, 31 are transmitted to second pump/motor 25 acting as a motor through hydraulic pipings 28, 47, respectively. Power of second pump/motor 25 is output from output shaft 26 of second pump/motor 25 to intermediate output shaft 11 by way of fourth gear 27, third gear 24, planetary gears 8 and carrier 9. In this way, the mechanical power from planetary gear mechanism 5A and the hydraulic power from second pump/motor 25 are combined into the rotational power of output shaft 16.

Even the present embodiment can have the same operational advantage as the third embodiment.

Fifth Exemplary Embodiment

Figure 9:
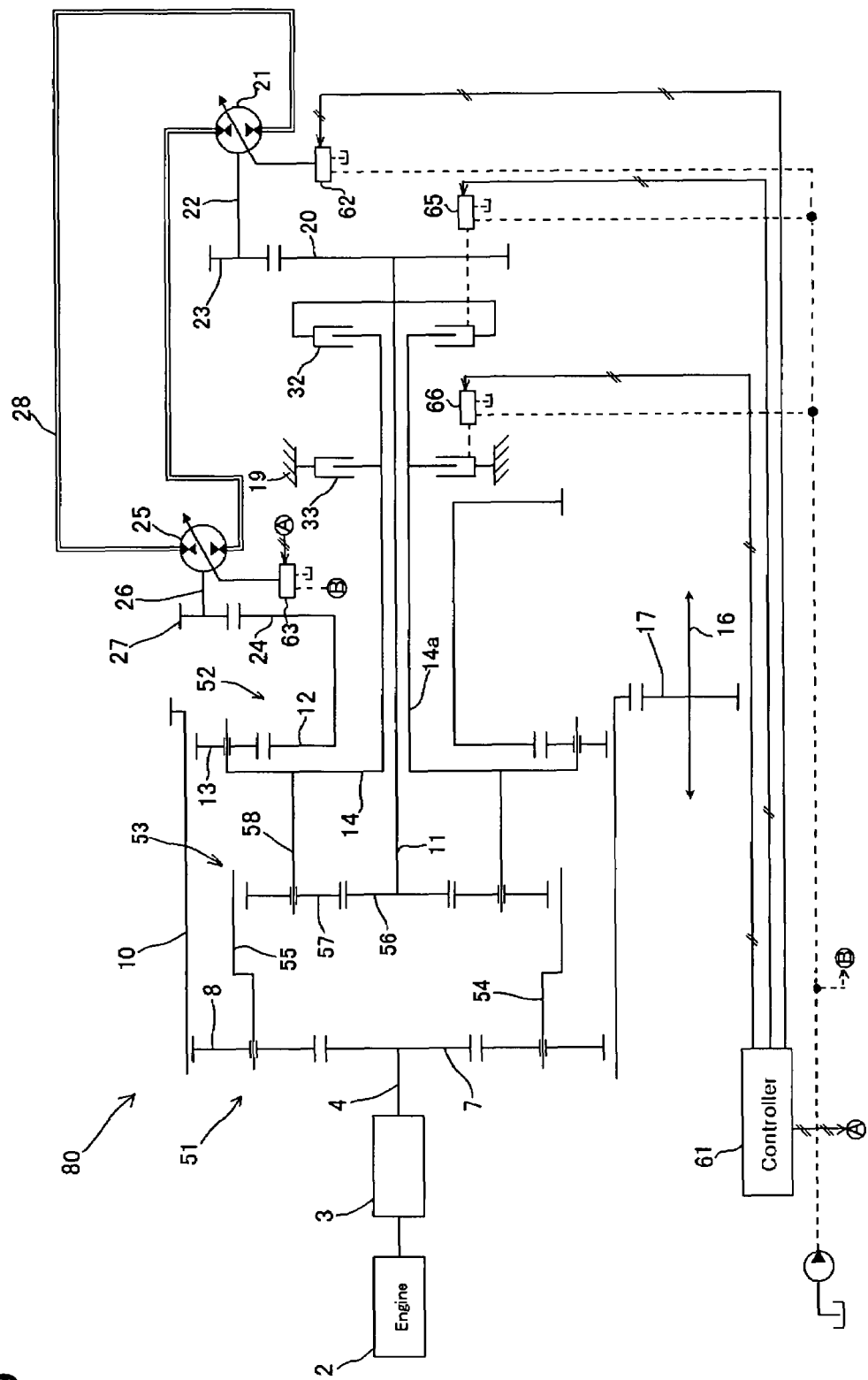
FIG. 9 is a schematic structural diagram of a transmission in accordance with a fifth exemplary embodiment of the invention.
Figure 10:
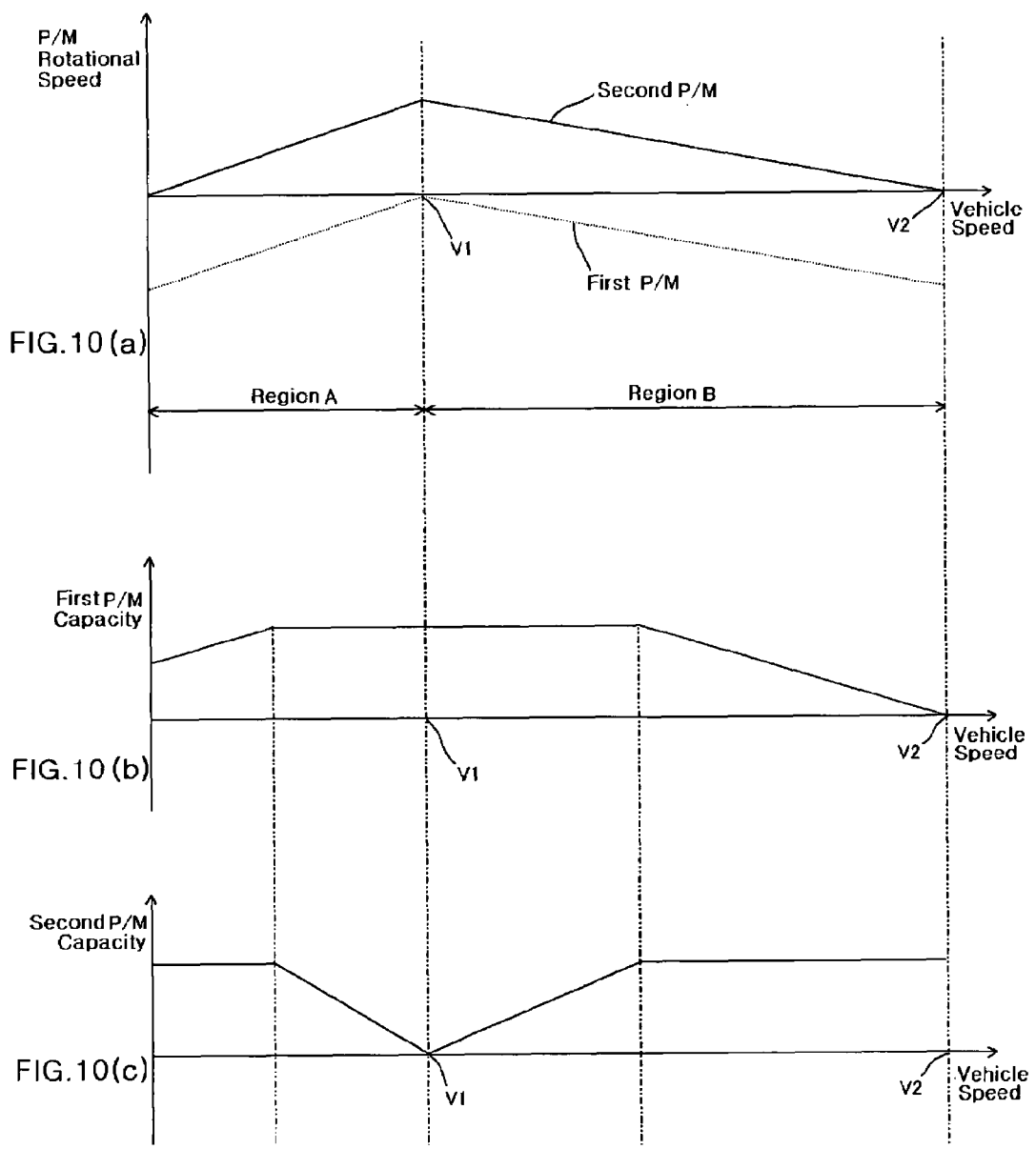
FIG. 10 shows operation characteristics of the transmission in accordance with the fifth embodiment.

FIG. 9 is a schematic structural diagram of a transmission in accordance with the fifth exemplary embodiment of the invention, and FIG. 10 shows operation characteristics of the transmission of the present embodiment. In this embodiment, elements similar to those in the foregoing embodiments have the same reference marks in the drawing, and the detailed descriptions of those elements are omitted.

Transmission 80 of this embodiment is a modification of transmission 50 of the second embodiment and is similar to the second embodiment in that third planetary gear mechanism 53 for adjusting a speed reduction ratio is disposed between first planetary gear mechanism 51 and second planetary gear mechanism 52.

In transmission 80 of this embodiment, when a vehicle is accelerated in a forward direction with engine speed kept constant and with first clutch 32 and second clutch 33 being in their respective OFF and ON states (region A of FIG. 10), power from engine 2 is input to sun gear 7 of first planetary gear mechanism 51 and then output to ring gear 10 from planetary gears 8. The power input to sun gear 7 is also transmitted from carrier 54 to intermediate output shaft 11 while being increased in speed by way of ring gear 55, planetary gears 57 and sun gear 56 of third planetary gear mechanism 53 and then output to first pump/motor 21 acting as a pump by way of first gear 20 and second gear 23. The power output to this first pump/motor 21 is transmitted to second pump/motor 25 acting as a motor through hydraulic piping 28. Rotational power of second pump/motor 25 is output from output shaft 26 of second pump/motor 25 to ring gear 10 by way of fourth gear 27, third gear 24, sun gear 12 and planetary gears 13. In this way, the respective powers from first planetary gear mechanism 51 and second planetary gear mechanism 52 are combined into rotational power of output shaft 16.

At vehicle speed V1, rotational speed of first pump/motor 21 becomes zero, and discharge capacity of second pump/motor 25 becomes zero. Here, vehicle speed V1 becomes a direct point (i.e., a low-speed direct point) at which all the power from engine 2 is transmitted through a mechanical transmission part alone. In region A, transmission 80 functions as an input-split type transmission.

At speed V1, first clutch 32 is switched to its ON state, and second clutch 33 is switched to its OFF state to enter region B of FIG. 10. In this region B, the power from engine 2 is input to sun gear 7 of first planetary gear mechanism 51 and then output to ring gear 10 from planetary gears 8. The power input to sun gear 7 is also transmitted from carrier 54 to intermediate output shaft 11 while being increased in speed by way of ring gear 55, planetary gears 57 and sun gear 56 of third planetary gear mechanism 53 and then output to second pump/motor 25 acting as a pump by way of carrier 14, sun gear 12, third gear 24 and fourth gear 27. The power output to this second pump/motor 25 is transmitted to first pump/motor 21 acting as a motor through hydraulic piping 28. Rotational power of first pump/motor 21 is output from output shaft 22 of first pump/motor 21 to ring gear 10 by way of second gear 23, first gear 20, carrier 14 and planetary gears 13. In this way, the respective powers from first planetary gear mechanism 51 and second planetary gear mechanism 52 are combined into the rotational power of output shaft 16.

At vehicle speed V2, rotational speed of second pump/motor 25 becomes zero, and discharge capacity of first pump/motor 21 becomes zero. Here, a direct point (i.e., a high-speed direct point) at which all the power from engine 2 is transmitted through the mechanical transmission part alone is generated. In region B, transmission 80 functions as a compound-split type transmission.

When compared to the transmission of the first embodiment, this embodiment's transmission 80 has third planetary gear mechanism 53 disposed for adjusting the speed reduction ratio, so that the speed reduction ratio of the first pump/motor can be optimized both in the input-split mode and in the compound-split mode. Thus, the first pump/motor can be of smaller maximum torque and of small size for use and can increase efficiency even when used at high rotations with its capacity reduced. Moreover, the present embodiment can use a one-way rotating type pump/motor as first pump/motor 21, thereby simplifying the structure of the transmission.

In each of the foregoing embodiments, each pump/motor can be formed of a combination of a plurality of (at least two) pump/motors, and only one of the pump/motors can be operated during an operation requiring small capacity. In that case, it is preferable that the one of the plurality of pump/motors be selectively connected and disconnected so as to be connected at low speeds to provide large capacity. Moreover, this pump/motor which can be connected and disconnected can have its speed reduction ratio different from those of the other pump/motors when connected to the planetary gear mechanism. This allows a speed range covered by each pump/motor to be varied, whereby the capacity of the pump/motor can be reduced.

Sixth Exemplary Embodiment

Figure 11:
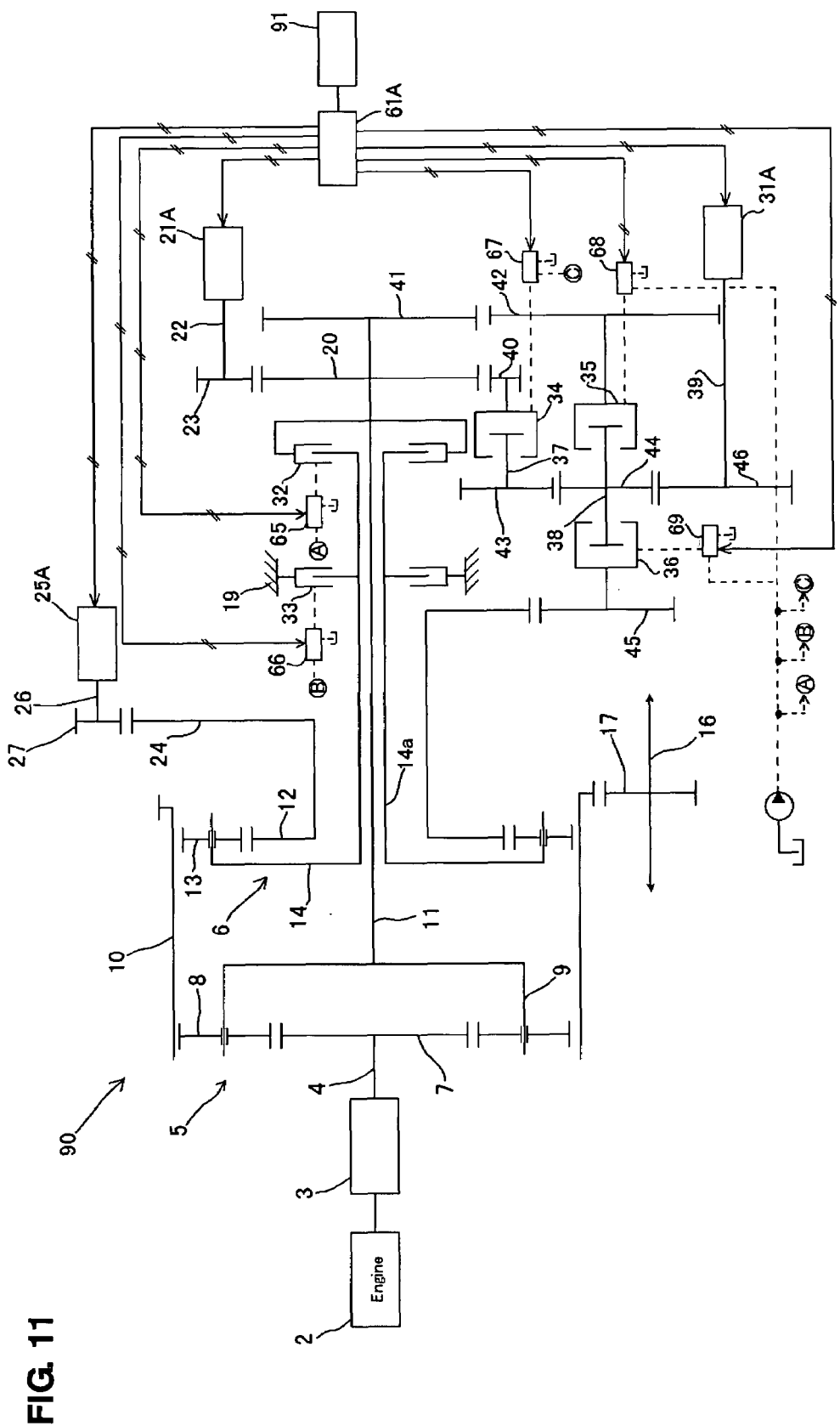
FIG. 11 is a schematic structural diagram of a transmission in accordance with a sixth exemplary embodiment of the invention.

FIG. 11 is a schematic structural diagram of a transmission in accordance with the sixth exemplary embodiment of the invention.

The present embodiment is an example of electro-mechanical transmission 90 having generator/motors 21A, 25A, 31A instead of pump/motors 21, 25, 31 of the first embodiment. In this case, generator/motors 21A, 25A, 31A are each driven and controlled by controller 61A connected to battery 91. Controller 61A includes inverter circuitry. Preferably, a storage device for storing electrical energy is interposed between a generator and a motor. Similarly to the first embodiment, each generator/motor of this embodiment can be of smaller maximum torque and smaller size for use than a conventional generator/motor.

The transmissions of the second through fifth embodiments can also be changed into electro-mechanical transmissions by having the pump/motors replaced by generator/motors.

The invention claimed is:
1. A transmission comprising:
an input shaft;
an output shaft;
a mechanical transmission part interposed between the input shaft and the output shaft, the mechanical transmission part including at least one planetary gear mechanism; and
a hydrostatic transmission part interposed between the input shaft and the output shaft, the hydrostatic transmission part including a plurality of pump/motors fluidly interconnected with one another through a hydraulic circuit,
wherein:
the plurality of pump/motors include a first pump/motor, a second pump/motor and a third pump/motor;
a rotating shaft of the first pump/motor and a rotating shaft of the second pump/motor are coupled to the mechanical transmission part;
the transmission further comprises a coupling mechanism for coupling a rotating shaft of the third pump/motor to at least one of the rotating shaft of the first pump/motor and the rotating shaft of the second pump/motor, and control means for controlling the coupling mechanism so as to couple the rotating shaft of the third pump/motor to both the rotating shaft of the first pump/motor and the rotating shaft of the second pump/motor such that all power input to the input shaft is transmitted to the output shaft only through the mechanical transmission part.

2. A transmission comprising:
an input shaft;
an output shaft;
a mechanical transmission part interposed between the input shaft and the output shaft; and
a hydrostatic transmission part interposed between the input shaft and the output shaft, the hydrostatic transmission part including a plurality of pump/motors fluidly interconnected with one another through a hydraulic circuit,
wherein:
the mechanical transmission part includes a first planetary gear mechanism and a second planetary gear mechanism;
the plurality of pump/motors include a first pump/motor, a second pump/motor and a third pump/motor;
the input shaft is coupled to a first element of the first planetary gear mechanism;
a rotating shaft of the first pump/motor is coupled to a second element of the first planetary gear mechanism;
a rotating shaft of the second pump/motor is coupled to a first element of the second planetary gear mechanism;
the output shaft is coupled to a third element of the first planetary gear mechanism and a third element of the second planetary gear mechanism; and
the transmission further comprises:
a first coupling mechanism for coupling a second element of the second planetary gear mechanism to at least one of a fixed end and the second element of the first planetary gear mechanism; and
a second coupling mechanism for coupling a rotating shaft of the third pump/motor to at least one of the rotating shaft of the first pump/motor and the rotating shaft of the second pump/motor.

3. A transmission comprising:
an input shaft;
an output shaft;
a mechanical transmission part interposed between the input shaft and the output shaft; and
a hydrostatic transmission part interposed between the input shaft and the output shaft, the hydrostatic transmission part including a plurality of pump/motors fluidly interconnected with one another through a hydraulic circuit,
wherein:
the mechanical transmission part includes a first planetary gear mechanism, a second planetary gear mechanism and a third planetary gear mechanism disposed between the first planetary gear mechanism and the second planetary gear mechanism;
the plurality of pump/motors include a first pump/motor, a second pump/motor and a third pump/motor;
the input shaft is coupled to a first element of the first planetary gear mechanism;
a rotating shaft of the first pump/motor is coupled to a first element of the third planetary gear mechanism;
a rotating shaft of the second pump/motor is coupled to a first element of the second planetary gear mechanism;
the output shaft is coupled to a third element of the first planetary gear mechanism and a third element of the second planetary gear mechanism;
a second element of the first planetary gear mechanism is coupled to a third element of the third planetary gear mechanism;
a second element of the second planetary gear mechanism is coupled to a second element of the third planetary gear mechanism; and
the transmission further comprises:
a first coupling mechanism for coupling the second element of the second planetary gear mechanism to at least one of a fixed end and the first element of the third planetary gear mechanism; and
a second coupling mechanism for coupling a rotating shaft of the third pump/motor to at least one of the rotating shaft of the first pump/motor and the rotating shaft of the second pump/motor.

4. A transmission comprising:
an input shaft;
an output shaft;
a mechanical transmission part interposed between the input shaft and the output shaft, the mechanical transmission part including a planetary gear mechanism; and
a hydrostatic transmission part interposed between the input shaft and the output shaft, the hydrostatic transmission p art including a plurality of pump/motors fluidly interconnected with one another through a hydraulic circuit,
wherein:
the plurality of pump/motors include a first pump/motor, a second pump/motor and a third pump/motor;
the input shaft is coupled to a first element of the planetary gear mechanism;
a rotating shaft of the first pump/motor is coupled to a second element of the planetary gear mechanism;
a rotating shaft of the second pump/motor is coupled to a third element of the planetary gear mechanism;
the output shaft is coupled to the second element of the planetary gear mechanism;
the transmission further comprises a coupling mechanism for coupling a rotating shaft of the third pump/motor to at least one of the rotating shaft of the first pump/motor and the rotating shaft of the second pump/motor.

5. A transmission comprising:
an input shaft;
an output shaft;
a mechanical transmission part interposed between the input shaft and the output shaft, the mechanical transmission part including a planetary gear mechanism; and
a hydrostatic transmission part interposed between the input shaft and the output shaft, the hydrostatic transmission part including a plurality of pump/motors fluidly interconnected with one another through a hydraulic circuit,
wherein:
the plurality of pump/motors include a first pump/motor, a second pump/motor and a third pump/motor;
the input shaft is coupled to a first element of the planetary gear mechanism;
a rotating shaft of the first pump/motor is coupled to the first element of the planetary gear mechanism;
a rotating shaft of the second pump/motor is coupled to a third element of the planetary gear mechanism;
the output shaft is coupled to a second element of the planetary gear mechanism;
the transmission further comprises a coupling mechanism for coupling a rotating shaft of the third pump/motor to at least one of the rotating shaft of the first pump/motor and the rotating shaft of the second pump/motor, and control means for controlling the coupling mechanism so as to couple the rotating shaft of the third pump/motor to both the rotating shaft of the first pump/motor and the rotating shaft of the second pump/motor such that all power input to the input shaft is transmitted to the output shaft only through the mechanical transmission part.

6. The transmission of claim 4, further comprising control means for controlling the coupling mechanism so as to couple the rotating shaft of the third pump/motor to both the rotating shaft of the first pump/motor and the rotating shaft of the second pump/motor such that all power input to the input shaft is transmitted to the output shaft only through the mechanical transmission part.

7. The transmission of claim 2 or 3, further comprising control means for controlling the second coupling mechanism so as to couple the rotating shaft of the third pump/motor to both the rotating shaft of the first pump/motor and the rotating shaft of the second pump/motor such that all power input to the input shaft is transmitted to the output shaft only through the mechanical transmission part.

8. A transmission comprising:
an input shaft;
an output shaft;
a mechanical transmission part interposed between the input shaft and the output shaft; and
a hydrostatic transmission part interposed between the input shaft and the output shaft, the hydrostatic transmission part including a plurality of pump/motors fluidly interconnected with one another through a hydraulic circuit,
wherein:
the mechanical transmission part includes a first planetary gear mechanism, a second planetary gear mechanism and a third planetary gear mechanism disposed between the first planetary gear mechanism and the second planetary gear mechanism;
the plurality of pump/motors include a first pump/motor and a second pump/motor;
the input shaft is coupled to a first element of the first planetary gear mechanism;
a rotating shaft of the first pump/motor is coupled to a first element of the third planetary gear mechanism;
a rotating shaft of the second pump/motor is coupled to a first element of the second planetary gear mechanism;
the output shaft is coupled to a third element of the first planetary gear mechanism and a third element of the second planetary gear mechanism;
a second element of the first planetary gear mechanism is coupled to a third element of the third planetary gear mechanism;
a second element of the second planetary gear mechanism is coupled to a second element of the third planetary gear mechanism; and
the transmission further comprises a coupling mechanism for coupling the second element of the second planetary gear mechanism to at least one of a fixed end and the first element of the third planetary gear mechanism.

9. The transmission of claim 1, 2, 3, 5 or 8, wherein a speed ratio of a low-speed direct point at which a rotational speed of the first pump/motor becomes zero to a high-speed direct point at which a rotational speed of the second pump/motor becomes zero is set at between three and four.

10. A transmission comprising:
an input shaft;
an output shaft;
a mechanical transmission part interposed between the input shaft and the output shaft, the mechanical transmission part including at least one planetary gear mechanism; and
an electric transmission part interposed between the input shaft and the output shaft, the electric transmission part including a plurality of generator/motors driven and controlled by an inverter,
wherein:
the plurality of generator/motors include a first generator/motor, a second generator/motor and a third generator/motor;
a rotating shaft of the first generator/motor and a rotating shaft of the second generator/motor are respectively coupled to the mechanical transmission part;
the transmission further comprises a coupling mechanism for coupling a rotating shaft of the third generator/motor to at least one of the rotating shaft of the first generator/motor and the rotating shaft of the second generator/motor, and control means for controlling the coupling mechanism so as to couple the rotating shaft of the third generator/motor to both the rotating shaft of first generator/motor and the rotating shaft of the second generator/motor such that all power input to the input shaft is transmitted to the output shaft only through the mechanical transmission part.

11. A transmission comprising:
an input shaft;
an output shaft;
a mechanical transmission part interposed between the input shaft and the output shaft; and
an electric transmission part interposed between the input shaft and the output shaft, the electric transmission part including a plurality of generator/motors driven and controlled by an inverter,
wherein:
the mechanical transmission part includes a first planetary gear mechanism and a second planetary gear mechanism;
the plurality of generator/motors include a first generator/motor, a second generator/motor and a third generator/motor;
the input shaft is coupled to a first element of the first planetary gear mechanism;
a rotating shaft of the first generator/motor is coupled to a second element of the first planetary gear mechanism;
a rotating shaft of the second generator/motor is coupled to a first element of the second planetary gear mechanism;
the output shaft is coupled to a third element of the first planetary gear mechanism and a third element of the second planetary gear mechanism; and
the transmission further comprises:
a first coupling mechanism for coupling a second element of the second planetary gear mechanism to at least one of a fixed end and the second element of the first planetary gear mechanism; and
a second coupling mechanism for coupling a rotating shaft of the third generator/motor to at least one of the rotating shaft of the first generator/motor and the rotating shaft of the second generator/motor.

12. A transmission comprising:
an input shaft;
an output shaft;
a mechanical transmission part interposed between the input shaft and the output shaft; and
an electric transmission part interposed between the input shaft and the output shaft, the electric transmission part including a plurality of generator/motors driven and controlled by an inverter, wherein:

the mechanical transmission part includes a first planetary gear mechanism, a second planetary gear mechanism and a third planetary gear mechanism disposed between the first planetary gear mechanism and the second planetary gear mechanism;

the plurality of generator/motors include a first generator/motor, a second generator/motor and a third generator/motor;

the input shaft is coupled to a first element of the first planetary gear mechanism;

a rotating shaft of the first generator/motor is coupled to a first element of the third planetary gear mechanism;

a rotating shaft of the second generator/motor is coupled to a first element of the second planetary gear mechanism;

the output shaft is coupled to a third element of the first planetary gear mechanism and a third element of the second planetary gear mechanism;

a second element of the first planetary gear mechanism is coupled to a third element of the third planetary gear mechanism;

a second element of the second planetary gear mechanism is coupled to a second element of the third planetary gear mechanism; and the transmission further comprises:

a first coupling mechanism for coupling the second element of the second planetary gear mechanism to at least one of a fixed end and the first element of the third planetary gear mechanism; and a second coupling mechanism for coupling a rotating shaft of the third generator/motor to at least one of the rotating shaft of the first generator/motor and the rotating shaft of the second generator/motor.

13. The transmission of claim 11 or 12, further comprising control means for controlling the second coupling mechanism so as to couple the rotating shaft of the third generator/motor to both the rotating shaft of first generator/motor and the rotating shaft of the second generator/motor such that all power input to the input shaft is transmitted to the output shaft only through the mechanical transmission part.

14. A transmission comprising:

an input shaft;

an output shaft;

a mechanical transmission part interposed between the input shaft and the output shaft; and an electric transmission part interposed between the input shaft and the output shaft, the electric transmission part including a plurality of generator/motors driven and controlled by an inverter, wherein:

the mechanical transmission part includes a first planetary gear mechanism, a second planetary gear mechanism and a third planetary gear mechanism disposed between the first planetary gear mechanism and the second planetary gear mechanism;

the plurality of generator/motors include a first generator/motor and a second generator/motor;

the input shaft is coupled to a first element of the first planetary gear mechanism;

a rotating shaft of the first generator/motor is coupled to a first element of the third planetary gear mechanism;

a rotating shaft of the second generator/motor is coupled to a first element of the second planetary gear mechanism;

the output shaft is coupled to a third element of the first planetary gear mechanism and a third element of the second planetary gear mechanism;

a second element of the first planetary gear mechanism is coupled to a third element of the third planetary gear mechanism;

a second element of the second planetary gear mechanism is coupled to a second element of the third planetary gear mechanism; and the transmission further comprises a coupling mechanism for coupling the second element of the second planetary gear mechanism to at least one of a fixed end and the first element of the third planetary gear mechanism.

15. The transmission of claim 10, 11, 12 or 14, wherein a speed ratio of a low-speed direct point at which a rotational speed of the first generator/motor becomes zero to a high-speed direct point at which a rotational speed of the second generator/motor becomes zero be set at between three and four.

* * * * *